US006989091B2

(12) United States Patent
Jorgensen

(10) Patent No.: US 6,989,091 B2
(45) Date of Patent: Jan. 24, 2006

(54) DEEP CONVERSION COMBINING THE DEMETALLIZATION AND THE CONVERSION OF CRUDES, RESIDUES, OR HEAVY OILS INTO LIGHT LIQUIDS WITH PURE OR IMPURE OXYGENATED COMPOUNDS

(75) Inventor: Pierre Jorgensen, L'Hay les Roses (FR)

(73) Assignee: World Energy Systems Corporation, Scottsdale, AZ (US)

( * ) Notice: Subject to any disclaimer, the term of this patent is extended or adjusted under 35 U.S.C. 154(b) by 0 days.

(21) Appl. No.: 10/428,212

(22) Filed: May 2, 2003

(65) Prior Publication Data

US 2004/0065589 A1 Apr. 8, 2004

Related U.S. Application Data

(63) Continuation of application No. 09/405,934, filed on Sep. 27, 1999, now abandoned.

(30) Foreign Application Priority Data

Oct. 16, 1998 (FR) .............................. 98 12983

(51) Int. Cl.
*C10G 9/00* (2006.01)

(52) U.S. Cl. ................... 208/106; 208/125; 208/128; 208/129; 208/130; 585/922; 585/923; 585/648

(58) Field of Classification Search ............. 208/106, 208/125, 128, 129, 130; 585/922, 923, 648
See application file for complete search history.

(56) References Cited

U.S. PATENT DOCUMENTS

| 1,415,232 | A | 5/1922 | Ellis ........................... 208/130 |
| 1,428,311 | A | 9/1922 | Adams ........................ 208/130 |
| 1,430,977 | A | 10/1922 | Gartlan ....................... 208/130 |
| 1,811,195 | A | 6/1931 | Watson ........................ 208/130 |
| 1,830,963 | A | 11/1931 | Rogers et al. .............. 208/129 |
| 1,935,148 | A | 11/1933 | Dubbs ........................ 208/129 |
| 2,977,299 | A | 3/1961 | Joseph et al. ................ 208/8 |
| 3,998,726 | A | 12/1976 | Bunas et al. ................ 208/309 |
| 4,097,366 | A | 6/1978 | Tanaka et al. .............. 208/127 |
| 4,264,332 | A | 4/1981 | Ziegenbaig et al. .......... 23/305 |
| 4,265,732 | A | 5/1981 | Dinulescu .................... 208/106 |
| 4,406,793 | A | 9/1983 | Kruyer ....................... 210/669 |
| 4,426,278 | A | 1/1984 | Kosters ....................... 208/130 |
| 4,482,453 | A | * 11/1984 | Coombs et al. ............. 208/309 |
| 4,543,177 | A | 9/1985 | Murthy et al. .............. 208/130 |
| 4,617,109 | A | 10/1986 | Wells et al. ................ 208/130 |
| 4,692,237 | A | 9/1987 | Hsu et al. ................... 208/177 |
| 4,724,272 | A | * 2/1988 | Raniere et al. ............. 585/500 |
| 4,737,265 | A | 4/1988 | Merchant, Jr. et al. ..... 208/188 |
| 4,832,822 | A | 5/1989 | Bernard et al. ............. 208/130 |
| 4,959,160 | A | 9/1990 | Lake .......................... 252/340 |
| 5,096,566 | A | 3/1992 | Dawson et al. ............. 208/106 |
| 6,132,596 | A | 10/2000 | Yu ............................. 208/179 |

FOREIGN PATENT DOCUMENTS

| DE | 10 49 851 | 2/1959 |
| WO | WO-98/12983 | 10/1998 |
| WO | WO-00/23540 | 4/2000 |

OTHER PUBLICATIONS

Modern Petroleum Technology Edited by Hubson et al. 1973 pp. 280–281.
PCT/US/99/23325 International Search Report Dated Jan. 28, 2000.

* cited by examiner

*Primary Examiner*—Walter D. Griffin
(74) *Attorney, Agent, or Firm*—Pillsbury Winthrop Shaw Pittman LLP

(57) ABSTRACT

A process for the conversion of hydrocarbons that are solid or have a high boiling temperature and may be laden with metals, sulfur or sediments, into liquids (gasolines, gas oil, fuels) with the help of a jet of gas properly superheated between 600 and 800° C. The process comprises preheating of feed 5 in a heater 8 to a temperature below the selected temperature of a reactor 10. This feed is injected by injectors 4 into the empty reactor 10 (i.e., without catalyst.) The feed is treated with a jet of gas or superheated steam from superheater 2 to activate the feed. The activated products in the feed are allowed to stabilize at the selected temperature and at a selected pressure in the reactor and are then run through a series of extractors 13 to separate heavy and light hydrocarbons and to demetallize the feed. Useful products appearing in the form of water/hydrogen emulsions are generally demulsified in emulsion breaker 16 to form water laden with different impurities. The light phase containing the final hydrocarbons is heated in heater 98 and is separated into cuts of conventional products, according to the demand for refining by an extractor 18 similar to 13.

32 Claims, 15 Drawing Sheets

DEEP CONVERSION COMBINING THE DEMETALLIZATION AND THE CONVERSION OF CRUDES, RESIDUES, OR HEAVY OILS INTO LIGHT LIQUIDS WITH PURE OR IMPURE OXYGENATED COMPOUNDS

RELATED APPLICATIONS

This application is a continuation of U.S. patent application Ser. No. 09/405,934, filed Sep. 27, 1999(abandoned), which claims foreign priority benefits under 35 USC 119(a)–(d) for French Patent Application No. 9812983, filed Oct. 16, 1998.

BACKGROUND OF THE INVENTION

1. Field of the Invention

The present invention relates generally to the conversion of hydrocarbons and more particularly to converting heavy hydrocarbons laden with impurities into light hydrocarbons that can be separated into cuts of conventional products.

2. Description of Related Art

It is widely known that all refining processes leave heavy residues that are poorly fusible or solid, which find few users and few outlets. It is also widely known that oil wells often encounter deposits containing crudes that are characterized by a very high density and very high viscosity, thus difficult to transport as such. These crudes are also characterized by a strong metal content such as Nickel and Vanadium, sediments and sludge, sulfur, salt, to mention only the main impurities, which contain poisons for any type of catalyst. Furthermore, regardless of what is done, it is impossible to completely avoid the deposits of these components on everything that comes into contact with these crudes. Thus it is understood that if any catalyst is used, all of its surface and all its pores will be quickly covered and the catalyst will be totally dead; then it would only occupy space in the reactor, even risking plugging it if grains are accumulated in the catalyst by the cement constituted by the sediments, nickel, vanadium, asphalts, carbon produced, etc.

We know processes such as the FCC, which attempt to adjust to carbon deposits by burning them in a regenerator, but this requires a complex circulation of the catalyst between the reactor and the regenerator. Furthermore, the circulation of said catalyst creates delicate problems of erosion, through both the actual wear of the matter itself, which is sometimes perforated, and that of the catalyst which, once worn, produces dangerous dusts for any human being that no filter, no matter how large and advanced will be able to stop. Following all the constraints encountered and compromises to be made, this type of unit can only treat distillates under vacuum (DsV), that is by eliminating from the feed the residues under vacuum (RsV) in which the metals, sediments, etc. are concentrated. Furthermore, the regenerator that burns the coke formed imposes a minimum temperature of the order of 700° C. so that the combustion may occur. The catalyst exiting the regenerator, sent into the reactor at this excessive temperature, leads to an abundant production of gaseous products, as well as highly aromatic heavy products that lost a significant quantity of hydrogen during the first contact with the catalyst that was too hot. Furthermore, it is impossible to change the spectrum of distribution of liquid conversion products which, moreover, are accompanied by a significant quantity of gas C1 C2 and LPG C3, C4.

The FCC only rearranges the distribution of the carbon and hydrogen in the molecules: it samples hydrogen in the high molecular weight molecules (high boiling temperature) to create light molecules, but the C4, C3, C2 and, in particular, C1 (CH4) take a large portion of the hydrogen. There is even a discharge of pure hydrogen. As a result, the heavy cuts knows as HCO are poor in hydrogen and cannot be recycled for a new conversion. Therefore, the conservation during the conversion of a good Hydrogen/Carbon ratio is vital.

The purpose of hydrocracking is precisely to increase the H/C ratio by adding hydrogen to the feed in an efficient manner. This process that consumes hydrogen requires the use of a hydrogen production unit which uses a lot of power and gaseous hydrocarbon containing matter (generally with a discharge of CO2 if CnH (2n+2)) is used as the starting point. Furthermore, the hydrogen becomes reactive only at pressures greater than 100 bars; this imposes a construction with very high thicknesses. The conjunction of the presence of hydrogen at temperatures of the order of 450° C. under 150 bars, in order to illustrate the ideas, presents delicate problems of realization and technology, in particular regarding the nature of the special alloy steels that are appropriate for these applications. Moreover, the conversion products saturated with hydrogen are highly paraffinic and, therefore, give gaseolines with a poor octane number. Therefore, it is necessary to use a catalytic reformer that removes hydrogen in order to increase the octane number. It seems periodical in these operations to begin by adding hydrogen to the products with great difficulty to then being forced to remove the same. Thus it is easy to understand why it is important to avoid useless operations in all of these operations regarding the hydrogen content.

Some research efforts were carried out attempting to create active hydrogen, designated as H, in order to incorporate the same into hydrogen-poor feeds. The creation of said H. requires a great deal of energy that is returned at the time of the final reaction and "blows up" the hydrocarbon molecules in question, possibly releasing the carbon. As a consequence, instead of incorporating hydrogen in the feed, unsaturated gases are created (generally 20 to 40% of the feed) by rejecting hydrogen overall.

Other research work was carried out regarding the use of hydrogen superheated at 1100–1200° C. at 40 bars, with soaking times of 60 seconds to hydropyrolize residues of oil and heavy oils, such as those of B. SCHÜTZE and H. HOFFMAN reported in Erdöl and Kohle-Erdgas-Petrochemie vereinigt mit Brennstoff-Chemie 1983, 36 No. 10,457–461. The results obtained always comprise high gas proportions (12 to 27%) and a large quantity of coke. From a thermodynamic standpoint, these two approaches are inefficient, as confirmed by all the practical results obtained (excess production of gas and coke).

It is widely known that the molecules composing the residue under vacuum may be "shaken" thermally with a VISCOSITY BREAKER (or Visbreaker), in order to "break" the viscosity. This creates a small additional production of feed that is generally converted with the FCC. We then have a visebreaker residue that is generally referred to as flash visbreaker residue (RVR), which can only be used as a heavy industrial fuel if light products such as gas oil or LCO (FCC gas oil) are added thereto in order to achieve a normal viscosity.

These examples illustrate the complexity of the refining operations with imbricated treatments and retreatments. The physical state of the matter (liquid, solid or gas) must receive a great deal of attention under normal conditions of temperature close to 20° C., and pressure close to 1 atmosphere.

We also know the COKERS that treat the residue to release the liquids while rejecting solid carbon, which will have the same applications as coal (also with the same difficulties).

We also know the improvement attempts carried out with the FLEXICOKER, which actually consists in gasifying the coke produced. The gasification requires a facility as large as that required by coking. It saturates the refinery with a fatal combustible gas that must be exported or used for other purposes than those that are strictly required for refining operations (i.e. to produce electrical power).

We also know the attempt to hydroconvert the RsV, known as the HYCON PROCESS, which would consume approximately 2.3% hydrogen. The 41% converted must be run through the FCC, with all the consequences that were mentioned in relation thereto, in particular regarding the direct leak of H2 and the loss of hydrogen contained in gases such as CH4 and C2H6.

These two processes are too complex and ultimately too difficult to implement in an efficient refining layout.

FW and UOP indicated on Oct. 27, 1997, that they implemented a catalytic process called AQUACONVERSION PROCESS in collaboration with UNION CARBIDE, for the catalyst. In practice, the general problems that are specific to catalysis remain intact. ELF ANTAR also claimed the preparation of an Aquazole containing 10 and 20% water, stable only from 15 days to one month.

SUMMARY OF THE INVENTION

One or more of the problems outlined above may be solved by embodiments of the present invention.

Referring to FIG. 1, one embodiment comprises a process for the conversion into liquids (gasolines, gas oil, fuels) of hydrocarbons that are solid or have a high boiling temperature, laden with metals, sulfur, sediments, with the help of water or oxygenated gas properly superheated between 600 and 800° C. The process comprises preheating a feed 5 in a heater 8 to a temperature below the selected temperature of a reactor 10. This feed injected by injector 4 into the empty reactor 10 (i.e., without catalyst.) The feed is treated with a jet of gas or superheated stream from superheater 2 to activate the feed. The activated products in the feed are allowed to stabilize at the selected temperature and at a selected pressure in the reactor and are then run through a series of extractors 13 to separate heavy and light hydrocarbons and to demetallize the feed. Useful products appearing in the form of water/hydrocarbon emulsions are generally demulsified in emulsion breaker 16 to form water laden with different impurities. The light phase containing the final hydrocarbons is heated in heater 98 and is separated into cuts of conventional products, according to the demand for refining by an extractor 18 similar to 13.

BRIEF DESCRIPTION OF THE DRAWINGS

Other objects and advantages of the invention will become apparent upon reading the following detailed description and upon reference to the accompanying drawings in which.

Figure 1:
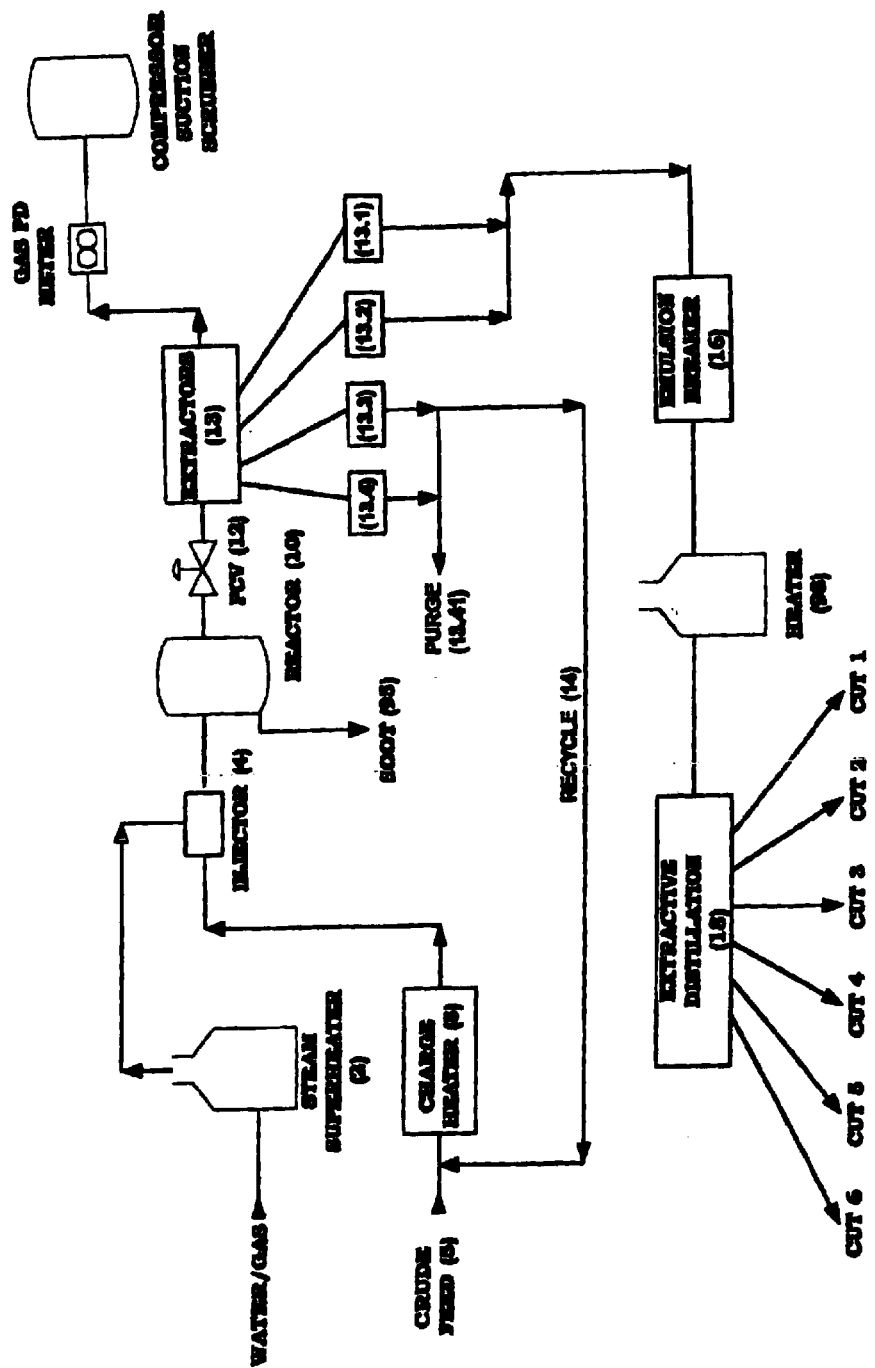
FIG. 1 is an illustration of the process layout of a unit according to an embodiment of our process for the steam conversion of hydrocarbon containing products.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Various embodiments may be characterized by the different features that are described below, which may be considered separately or together, this list being given for information purposes, without being all-inclusive.

(1) The feeds are taken as they appear. In the refinery, our process, to which we will refer as CPJ, can accept indiscriminately crude oil, atmospheric residue (Rat), residue under vacuum (RsV) or heavy distillates.

(2) The process never uses any vacuum processes that require large distillation columns which must also withstand the crushing strength of the atmospheric pressure.

(3) The feed introduced is treated with gases or vapors that act as energy vectors.

If the process is carried out in a refinery, the vapor is preferably steam.

If the process is carried out in an arid or desert area, the gases are preferably N2+CO2 (i.e. taken directly from the fumes exiting the furnaces).

Any combination is possible and has been tested. For example:

in a refinery that has a hydrogen unit, the CO2 rejected by a Benffield hydrogen decarbonation unit can be used;

a CO2gas+H20 (steam) mixture can be used;

a mixture of CO2+xH2 exiting the Benffield hydrogen production unit prior to decarbonation, a mixture that provides some benefits for the octane number of the gasolines produced, can be used;

CO2+xH2 or CO2+H2+H2O are appropriate.

The most favorable gases or vapors will contain oxygen and/or hydrogen. These components can be bound or mixed, such as, for example:

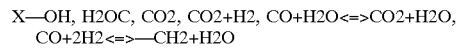

or still CO2+H2 resulting from a Bensfiel unit after shift conversion and before decarbonation in a hydrogen production unit. Pure N2 is acceptable but not very beneficial. It may be selected only accompanied with CO2 originating preferably in the combustion fumes.

The direct introduction of O2 requires special injection precautions. For example, it is possible to inject 2CH4+O2=>2CO+4H2+Heat with a pre-injector. (In this case, pure O2 is not required. The air (O2+4N2) is sufficient.)

This alternative may be considered to resorb excess light gases (C1, C2) into primary chemical energy, the matter being partially recovered in a special extractor towards 200° C.–220° C., 20–30 bars. This shows another aspect of the extreme flexibility of the CPJ process. Sulfur does not hinder the process and may even be beneficial (except regarding the resistance to corrosion).

(4) The gases are heated, preheated or prepared in classic furnaces.

(5) The fresh feed and any recycled components are appropriately preheated in a conventional furnace or by trains of classic heat exchangers.

(6) The feed is injected into the reactor by an injector that creates an intimate contact between the preheated feed and a jet of gases, during the expansion, properly preheated (or superheated in the case of pure steam). This injector also attempts to create a free jet of matter and gas that does not come into contact with any material wall, in order to facilitate the initiation of the reactions. The energy supply determined by the temperature, the flow rate and the expansion rate in the injector, releases a usable quantity of mechanical energy that provides for the supply of the energy that is necessary and barely sufficient to initiate the reactions without tearing the peripheral hydrogen of the molecules and without creating an energy such that the molecule may be broken into very small fragments, as may occur in a FCC.

(7) The soaking reactor is an empty container. No catalyst was used. This reactor enables the reactions initiated by the injector to achieve the equilibrium. The pressure reduces the volume necessary and increases the speed of the process to achieve equilibrium. The absence of any matter in the reactor presents the advantage of not having any stagnation points for the reactants, leading to a soaking time that is too long and, consequently, causes carbon deposits.

(8) The products, vapor and gas are then expanded at a pressure close to the atmospheric pressure, upon exiting the cracking reactor. If 2CH4+O2 or 2CO+4H2 was introduced for the purposes of recovering a carbon of gaseous origin, the outlet of the soaking reactor is cooled towards 200°–220° C. without breaking the pressure, which makes it possible, as a secondary capacity, to establish the equilibrium of the reactions for the addition of CO+H2, giving —CH2—, which attaches to the mater contained in the H2O/hydrocarbon emulsion that is used in this case. CO+H2 can also provide a functional block:

which adds itself to the unsaturated bonds to give aldehydes, the simplest example being:

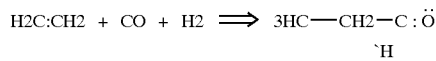

All of these reactions contribute to creating liquids and eliminating or blocking the creation of gas. The products are then expanded at the atmospheric pressure.

(9) In all cases, they are properly cooked and separated by a series of special devices that provide for the separation of heavy liquid phases from light gaseous phases at temperatures properly selected according to the physical characteristics of the products.

(10) The heavy products not complying with the selected norm are recycled with the fresh feed.

(11) The light products that comply with the selected norm are extracted. In the presence of steam, they appear in the form of very stable water/hydrocarbon emulsions that can be broken easily.

(12) The Breakdown of the heavy molecules occurs in a controlled manner in all of these processes. Roughly, it is possible to say that the weight of the molecules is divided by 2 upon each run in the injector, with a conversion rate of (1−1/e=0.63). Therefore, this process barely changes the H/C ratio of the products.

(13) The control of the breakdown of the molecules makes it possible to avoid producing gases by never implementing the energy required for their formation and by selecting conditions for the equilibrium of the molecules in the reactor that do not favor the appearance of such gases.

(14) The useful products may be either: hydrated and composed by the emulsion mentioned in 11; or anhydrous and obtained by a dehydration with extraction.

None of the above-mentioned processes is critical by itself and may be compensated by the other to the detriment of reduced outputs, conversion rates, a higher energy consumption or a greater production of solid carbon.

According to another series of characteristics of one embodiment, a great deal of attention is given to the constraints of the matter during the treatment.

Although this only constitutes a very rough and imperfect explanation attempt, it is possible to imagine that the heat, in its thermal aspect, is stored in the form of mechanical vibrations of the molecules. The vibrations generate mechanical constraints that, due to the inertia related to the mass, are the highest in the middle of the molecule, if the vibrations are moderate. These constraints then cause a break in the middle of the molecule. The more the molecule is heated (or more generally, the more energy of any kind it must store), the more it will vibrate. In this respect, it will vibrate according to harmonic modes with several vibration antinodes and troughs such as those that can be observed on a piano chord or the halyard of a flag waving in strong winds, or also on a long rod being shaken. Since the troughs of the vibration constitute the seat of the maximum constraints, the molecule will break at these points, at one-third, one-fourth, etc. of its length. This explains that if a molecule is heated excessively (if too much energy is transmitted thereto), it will break into very small fragments, stopping at CH4 and even carbon C.

With this brief explanation, it is also possible to understand that as the length of the molecule increases (thus the more massive and the heavier it becomes), it will have more vibrating elements, and the central elements that hold together the lateral elements being agitated will be subject to higher constraints to hold said lateral elements. When the constraints are too great, the molecules break.

This example makes it possible to explain that the heavier the molecule becomes, the less it is capable of withstanding the heat without cracking. To illustrate the concept, the CH4 cannot withstand temperatures greater than 700° C., and the heavy residues cannot withstand temperatures greater than 430° C. Regarding the selection of the devices, these constraints are also reflected by the maximum acceptable heat flows expressed in Kcal/hour/square meter, or also by the acceptable differences of temperature between the hot wall and the cold fluid. The critical values depend on the considered products characterized by their physical state (liquid, solid, vapor) under operating conditions. It is thus very important to obtain a practical knowledge of what may occur with the products treated.

The following example will explain the stakes with simply molecules as common as C10H8, constituted by two aromatic nuclei.

Note each cycle of 6 aromatic carbons Ä, A for the cycle . . . for the double bonds in each nucleus.

Ä:Ä here indicates two Ä carbons are bound.

Ä:Ä is heated excessively, it loses hydrogen and becomes highly reactive, thus producing:

| Ä:Ä | Ä:Ä |
|---|---|
| + | " |
| Ä:Ä | Ä:Ä |
| C10H8 + C10H8 ⇒ | C20H12 + 2H2 |
| tf = 80° C. | tf = 278° C. |
| Téb = 218° C. | Téb = 350 (sublime) |
| d = 0.963 | d = 1.36 |
| n = 1.60 (liq) | n = 1.88 |

We go from a solid/liquid to a very hard solid. (By the same token, it is necessary to note that the molecules with 20 carbons constitute the products that are generally referred to as gas oil or light domestic fuel.) Another characteristic of one embodiment thus consists in preventing such situations from appearing.

It was observed that the freshly broken chains were naturally very reactive at right angles with the break, and that the polar molecule HÖH (water) attached itself readily on said breaks, just like ÖCÖ (carbon dioxide).

Another characteristic of one embodiment consists in introducing oxygen in the conversion process.

In order to better understand the uniqueness and highly inventive nature of our process, we will attempt to provide an explanation of what should be done and what must be avoided. To this effect, we will again select an example from the family of C20:

| C20H14Ö2 | Tf = 300° C. | Téb = Sub | HÖ,Ä:Ä-Ä:Ä,öH |
|---|---|---|---|
| C20H14 | Tf = 188° C. | Téb = 452 Sub | Ä:Ä-Ä:A |
| C20H14Ö | Tf = 81° C. | Téb = 264/15 mm | Ä:Ä-o-Ä:Ä |

Replacing hydrogen with a lateral OH is not good (the fusion temperature goes from 188° C. to 300° C.). If O eliminates a C—C bond, a beneficial effect is obtained (the fusion temperature goes from 188° C. to 81° C.).

We will now consider the case where the molecule C20H14 is weakened by an appropriate temperature that causes its vibration, and we send a molecule HÖH (H20) to the central bond:

| C20H14 + H2O | → | C10H7öH | + | C10H8 |
|---|---|---|---|---|
| H H | | | | |
| Ö | | | | |
| Ä:Ä - Ä:Ä | | Ä:A-öH | + | Ä:Ä |
| Tf = 188° C. | | Tf = 123° C. | | Tf = 80° C. |
| Téb = 452 sub | | Téb = 295° C. | | Téb = 218° C. |
| d = 1.30 | | d = 1.01 | | d = 0.963 |
| n = 1.76 | | n = 1.62 | | n = 1.60 liq |

The presence of water is highly beneficial on the products formed. Let's reconsider the highly compact molecule C20H12, attached by 2 H2O; we have:

| C20H12 + 2H2O | → | C10H7öH | + | C10H7öH |
|---|---|---|---|---|
| H H | | | | |
| Ö | | | | |
| Ä — Ä | | | | |
| Ä - Ä | → | Ä:Ä-öH | + | Ä:Ä-öH |

| | | |
|---|---|---|
| O | | |
| H' 'H | | |
| Tf = 278° C. | Tf = 123° C. | Tf = 123° C. |
| Téb = 350 Sub | Téb = 295° C. | Téb = 295° C. |
| d = 1.36 | d = 1.01 | d = 1.01 |
| n = 1.88 | n = 1.62 | n = 1.62 |

This example clearly shows all the benefits that may be obtained from steam.

Through thermodynamic considerations, it is also possible to determine that the free solid carbon that may form is oxidized towards 600–700° C., according to the following reactions:

| CO2 + Cs → | 2CO | AS = 42.14 | AH = 41.23 | Téq = 705° C. |
|---|---|---|---|---|
| H2O + Cs → | CO + H2 | AS = 33.04 | AH + 31.40 | Téq = 677° C. | where AS is the entropy variation, AH the enthalpy, and Teq the equilibrium temperature under a pressure of 1 bar.

We have another possible explanation for the beneficial effect of H2O and CO2 which, when implemented correctly in the injector, tend to eliminate the solid carbon that may form inadvertently.

As may be seen in these examples, the measurement of the physical characteristics and, in particular, the refractive index, makes it possible to follow the direction of the evolution of the conversion products and to direct said conversion.

It will be easier to understand the purpose of one embodiment, which consists in operating under conditions that avoid hydrogen losses, as this hydrogen loss creates unsaturated components that evolve towards low fusibility nuclei.

If we consider the straight chain described below, when it is heated to a high temperature, it begins to lose hydrogen according to the following layout:

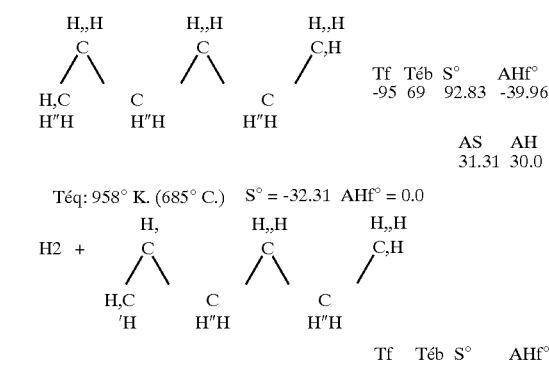

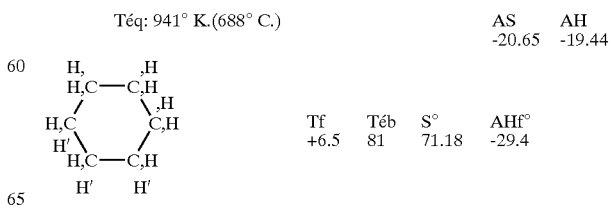

Then, the unsaturated chain folds and closes:

The fusion temperature goes from −95° C. to +6° C. with only 6 carbons. We thus realized that, on one hand, we should never have come close to these temperatures of the order of 650° C. and, on the other hand, the energy required in this case should not have been supplied; the thermodynamic values indicated above provide orders of magnitude. Furthermore, it is observed that when the dehydrogenation process begins, the reaction runs away because the cyclization releases energy.

Here is what could occur if there is a more violent supply of energy:

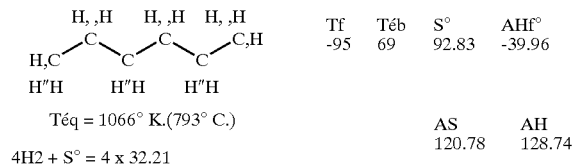

Téq = 1066° K.(793° C.)

4H2 + S° = 4 x 32.21

After the initial conditioning of the appropriate products thanks to our injector, one embodiment makes it possible to initiate and activate the reactions while complying with the preceding rules and the orders of magnitude that should not be exceeded.

We will know present another benefit of the presence of H2O which behaves somewhat like a blocker of cyclization reactions.

The heavy crudes contain very few simple and straight molecules; they contain numerous complex polyaromatic molecules that are more or less bound to each other, as may be observed in the following molecule that condenses readily and goes from 2 to 3 nuclei, according to the following layout:

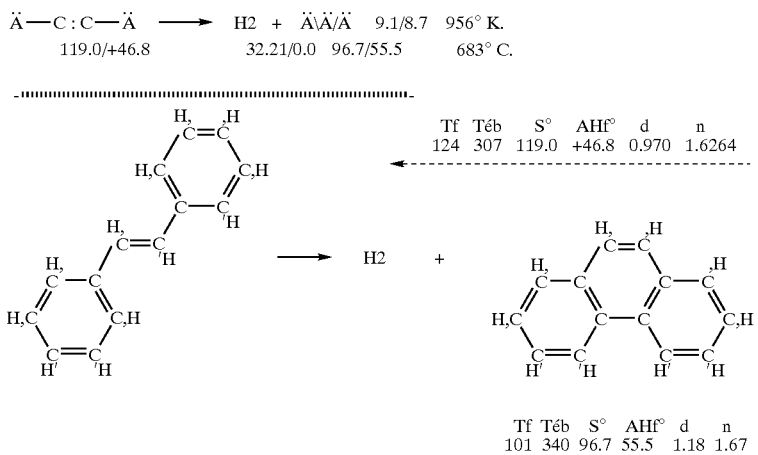

-continued

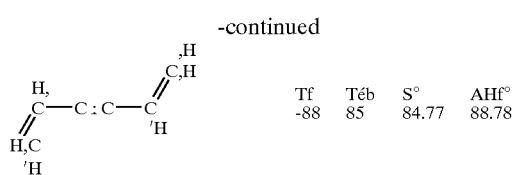

The highly dehydrogenated chain closes:

Téq = 3381° K.            AS      AH
                          −20.4   −68.98

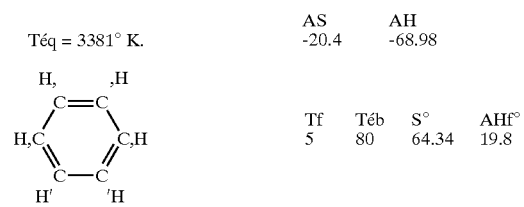

Extracting a H2 from a Straight Chain

Creates approximately: &S/H2=+30.19 and requires approximately: &H/H2=+32.18

Closing a cycle releases energy (and reduces &S by approximate 20.5).

By the same token, it is observed that the creation of a third central nucleus increases significantly the density of this molecule.

With H2O steam it is possible to operate by steps in order to break this molecule of 14 carbons, and even show how to resorb a light molecule of 3 carbons which would otherwise produce gases.

|  | AS/AH |
|---|---|
| 1st Step: Weakening of the central unsaturated bond: | |
| Ä>—CH:CH—<Ä + H2O → Ä>—CHöH—CH2—<Ä<br>Tf = 124 Téb = 307° C.    Tf = 68 Téb = 170/15 | −29.96/−12.50 |
| 2nd Step: Central cracking of the molecule: | |
| Ä>—CHöH—CH2—<Ä → Ä>—CHÖ + H3C—<Ä<br>Tf = −26 Téb = 178 Tf = −94 Téb = 110 | +26.27/+39.31 |
| 3rd Step: Fusion and rejection of H2O (sure to occur) | |
| Ä>—CHÖ + C3H8 → Ä>—C2—CH:CH2 + H2O<br>Tf = −33 Téb = 190° | −2.04/−14.36 |
| 4th Step: Cyclization of unsaturated branch (natural) | |
| Ä>—C2—CH:CH2 → Ä:Cyc6Csat<br>Tf = −43 Téb = 195 | −15.44/−19.90 |

-continued

| | | | |
|---|---|---|---|
| Ä>—CH:CH—<Ä + C3H8 → | Ä:Cy6sat + Ä>—CH3 | −21.17/−7.45 | |
| * * * * v * * * * * | * * * v * * * | * * * v * * * | |
| Tf = 124 Téb = 307° C. | Tf = −43 Téb = 195 | Tf = −94 Téb = 110 | |
| FOL | Light Gas Oil | Gasoline | |

It is possible to observe that the intermediate steps of the reaction are executed with moderate energy levels and that the whole reaction occurs as though the water implemented at the beginning is recovered at the end (similar to the action of a catalyst).

It is also appropriate to note, being one of our concerns and characteristic of our process, that the initial fusion temperature of 127° C. after the first step decreased to −26° C., then −33° C.; by the fourth step, the temperature was −43° C. and finally, by the fifth step, products with a fusion temperature of −94° C. were obtained.

Thus, there is continuous decrease of this fusion temperature during the intermediate steps of the overall reaction. The experiment showed that there was a very small production of gas and carbon and that it was possibly to fully convert products such as those referred to as residue under vacuum or asphalts, into liquid hydrocarbons.

We will consider the case of straight chains (with 14 unsaturated carbons for this example):

Without H2O we have:

| | AS AH |
|---|---|
| Cé14 → C7H16 + C2é7H12 | 36.04/19.57 |

The cracking in the presence of H2O appears to occur according to the following layout:

| | AS AH |
|---|---|
| Cé14 (C14—H28) → Cé7—H13). + (C7—H15) | 43.71/59.98 |
| .Cé7—H13 + H2O → Cé7H13oH + .H | 1.91/37.89 |

-continued

| | AS AH |
|---|---|
| .C7H15 + .H → C7H16 | −30.72/−87.3 |
| Cé7H13oH → C2é7—H12 + H2O | 21.14/9.0 |
| Which gives, in total: Cé14 → C7H16 + C2é7H12 | 36.04/19.57 |

It is observed that, in these operations, it was first necessary to: open a C—C bond which required approximately 40 to 60 Kcal (activation); and finally, supply approximately 20 Kcal/cut (net specific energy).

Remember that the extraction of one H2 requires approximately: &H/H2=+32 Kcal and that if this is done, poor results are obtained.

Therefore, it was necessary to find a set of devices that made it possible to meet as much as possible the different specifications listed above, which was achieved through the adequate preheating of the feed, followed by the activation resulting from an expansion in the injector, in which case the products to be converted could have, in terms of temperature equivalent, a very brief stay in a range where they are unstable, as the break consumes the energy that brings the reactants back into the stable and desired range of the reactor where they then achieve the thermodynamic equilibrium (a cook would say: to allow them to "simmer" properly).

These reactions and their mechanisms are provided here only in an attempt to explain why we obtain unexpected conversion results with out process.

The in-depth analysis of the results of our tests taught us to define how a given feed could be treated and also what were the problems linked to the structure of the complex matter constituted by these heavy products; all that which has been provided above constitutes only a guideline for the necessary adjustments.

We clearly took advantage of all these experiments in order to constitute a database of thermodynamic and physical property data, of which an extract is provided below for information purposes, for the families of 1 and 10 carbons per molecule:

| | | | Physical and Thermodynamic Properties | | | Family | | | | |
|---|---|---|---|---|---|---|---|---|---|---|
| (1) Name | Tf ° C. | Téb ° C. | S° | AHf° | d | n | Tc ° K | Pc | Vc | zc |
| CH4 | −186 | −165.0 | 44.49 | −17.89 | 0.415 | .gas.. | 190.7 | 45.8 | 99 | 0.290 |
| CO | −199 | −191.0 | 47.30 | −26.41 | 0.793 | .gas.. | 133.0 | 34.5 | 93 | 0.294 |
| H2CÖ | −92 | −21.0 | 52.26 | −28.00 | 0.815 | .gas.. | 410.0 | 67.0 | 112 | 0.223 |
| H3CoH | −97.1 | 64.7 | 57.00 | −48.05 | 0.812 | 1.3288 | 513.2 | 78.5 | 118 | 0.220 |
| HCOoH | +8.3 | 100.7 | 59.40 | −90.50 | 1.220 | 1.3714 | 581.0 | 71.8 | 117 | 0.176 |
| (10) Pj-Mend Units Names | ° C. Tf | ° C. Téb | cal/m S° | Kcal/m AHf° | <—a d | 20° C. —> n = 1, | ° K Tc | bar Pc | cc/m Vc | g/m PM | zc = 0, Str |
| | | | | (n − 1) | | | | | | |
| C10H8 | n14 | 80 | 218 | 80.5 | 36.1 | 0.963 | .5898 | 748 | 40.0 | 413 | 128 .269 Ä:Ä |
| C10H12 | t98 | −36 | 207 | <83.2 | 4.2 | >0.970 | .5414 | <717 | 33.0 | 478 | >132 .268 ÄCy6 |
| C10H14 | n189 | — | 200 | <84.5 | −11.7 | >0.934 | .5260 | <707 | 30.6 | 500 | >134 .264 2Ä-6H |
| C10H18 | d6 | −43 | 195 | 87.1 | −43.6 | 0.897 | .4810 | 687 | 25.8 | 543 | 138 .249 2Cy6 |
| C10H18 | d74 | −36 | 174 | 125.3 | 9.85 | 0.766 | .4265 | 623 | 25.8 | 587 | 138 .297 aC10 |

-continued

|  |  |  | Physical and Thermodynamic Properties |  |  |  |  | Family |  |  |  |  |
|---|---|---|---|---|---|---|---|---|---|---|---|---|
| C10H20 | d66 | −66 | 171 | 129.2 | −29.3 | 0.741 | .4215 | 616 | 25.0 | 592 | 140 | .292 éC10 |
| C10H22 | d20 | −30 | 174 | 130.2 | −59.7 | 0.730 | .4102 | 619 | 20.8 | 602 | 142 | .246 nC10 |
| C10H20Ö | d18 | −5 | 208 | 137.7 | −78.9 | 0.830 | .4287 | 636 | 24.4 | 605 | 156 | .278 Ald. |
| C10H21oH | d57 | +7 | 229 | 142.1 | −96.4 | 0.830 | .4372 | 667 | 29.8 | 619 | 158 | .337 alc. |
| C10H19ÖoH | d42 | 32 | 270 | 142.3 | −143. | 0.886 | .4288 | 717 | 29.4 | 644 | 172 | .322 Acid |
|  |  |  |  |  |  | (n − 1) |  |  |  |  |  |  |

Note the ranking: Oxygenated/Alkanes/Alkenes/Alkynes/Cyclo/Aromatics
The abbreviations are:
Tf: fusion temperature
Teb: Boiling temperature
S°: Standard entropy
ΔHF°: Standard formation enthalpy
d: Density
n: Refractive index
Tc: Critical temperature
Pc: Critical pressure
Vc: Critical volume
zc: Compressibility factor
Str: Structure, abbreviated:
Ä aromatic nucleus, Cy saturated cycle
Å acetylenic, é ethylenic, n normal paraffinic
Ö double bond oxygen, oH OH functional group These data help in monitoring, knowing or predicting the state of the matter under the different conditions of its treatment, as well as the possible thermodynamic equilibriums. These data also enables us to predict the chemical irreversibilities that are responsible for the production of carbon and the rejection of hydrogen, in particular. In conclusion, we will describe a guideline that helped us greatly in the analysis of these problems, as seen in a new light, from a mechanical point of view.

Let's consider as isoC4 cyclo C6. First, the molecule must be twisted to transform it from the free and natural deployed state to the folded state, which requires energy. If we then strip each end of the folded isoC4 branch, near the nucleus cyclo C6, also by removing the corresponding hydrogen, we establish two new carbon-carbon bonds. The molecule thus formed with only 10 carbons is a true cage that has the surprising physical properties indicated below:

| C10H16 | a742 | Tf = 268 | Teb = Sublime | Density = 1.070 n = 1.5680 |
|---|---|---|---|---|
| C10H20 | c686 | Tf = −94 | Teb = 171 | Density = 0.795 n = 1.4386 |

The references given are from: Handbook of Chemistry and Physics

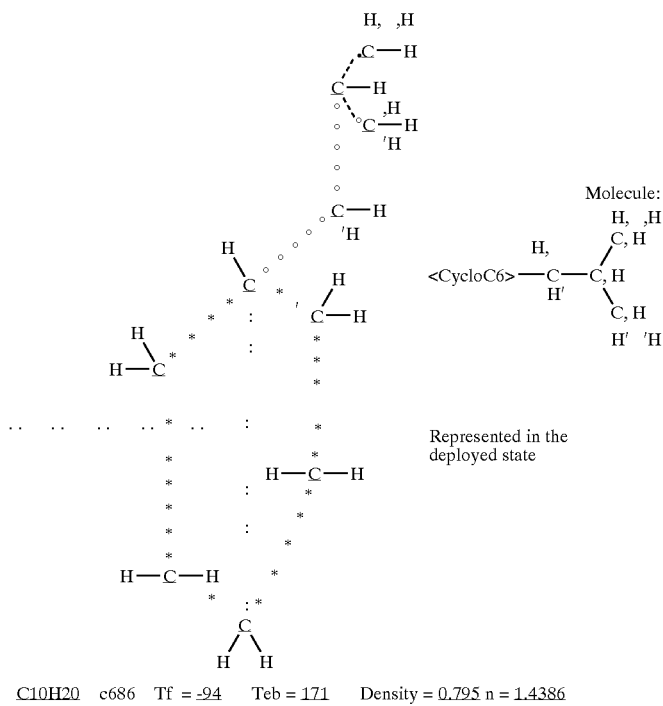

C10H20   c686   Tf = −94   Teb = 171   Density = 0.795 n = 1.4386

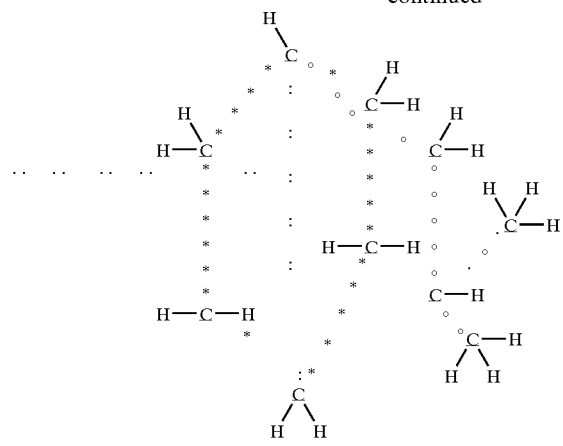

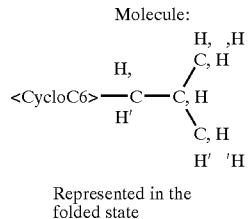

Molecule:

Represented in the folded state

C10H16 a742 Tf = 268   Teb = Sublime   Density = 1.070   n = 1.5680

Molecule Ref. a742
with:
4  :C—H
" " " " " " "
and
4 Cycles with 6 Carbons

Note the "CAGE" structure

Note that these cage molecules (in particular if they are aromatic) become true "nests" or "sandwiches" for metals and organometallics, which we will describe below.

Control of the Appearance of Gas, Coke or Solid Carbon Residues

One of the surprising characteristics of our process is that it makes it possible to convert asphalt's without generating significant amounts of carbon or gas. We will attempt to explain why this result may be obtained, on the basis of the knowledge that we have acquired while attempting to interpret our observations.

With appropriate means mechanical, thermal, electrical or chemical, etc.), it is always possible to transfer an energy, to which we will refer as AH (enthalpy variation), according to the terms generally used in thermodynamics. Our experience in monitoring the state of the matter led us to adopt, on a continuous basis, a variation key for said state that may be summarized by AS, the entropy variation. In fact, by referring to the tables that we have already presented, it is possible to observe the existence of very strong correlations between SXL and the physical fusion and boiling parameters and, more generally, the parameters pertaining to the change of state or the organization of the matter. In order to explain the ideas, we will select an unsaturated molecule containing 14 carbons.

| INPUT | | <--- OUTPUTS ---> Liquid | | GAS | AS | AH | Téq ° C. |
|---|---|---|---|---|---|---|---|
| Cé14H28 | ⇒ | Cé7H14 | + Cé7H14 | — | 36.06 | 19.18 | |
| - - - v - - - | | - - - v - - - | - - - v - - - | | — | — | 269° |
| Tf = −13 Téb = 251° | | Tf = −119 Téb = 94° | Liq | | | | |
| d = 0.771 n = 1.4335 | | d = 0.697 n = 1.400 | | | | | |
| Cé14H28 | ⇒ | Cé12H24 | | + Cé2H4 | 33.83 | 22.33 | |
| - - - v - - - | | - - - v - - - | | - - - v - - - | — | — | 387° |
| | | Tf = −35 Téb = 213° | | Gas | | | |
| | | d = 0.755 n = 1.430 | | | | | |
| Cé14H28 | ⇒ | Cá13H24 | | + CH4 | 36.39 | 26.54 | |
| - - - v - - - | | - - - v - - - | | - - - v - - - | — | — | 456° |
| | | Tf = 5° Téb = 234 | | Gas | | | |
| | | d = 0.784 n = 1.437 | | | | | |

-continued

| INPUT | | ← --- OUTPUTS --- → Liquid | | GAS | AS | AH | Téq ° C. |
|---|---|---|---|---|---|---|---|
| Cé14H28 | ⇒ | Cä14H26 | | + H2 | 27.41 | 39.50 | |
| - - - v - - - | | - - - v - - - | | - - - v - - - | — | — | 1168° |
| | | Tf = −0° Téb = 252 | | Gas | | | |
| | | d = 0.789 n = 1.439 | | | | | |
| Cé14H28 | ⇒ | Cä7H12 | + Cé7H14 | + H2 | 63.48 | 64.02 | |
| - - - v - - - | | - - - v - - - | - - - v - - - | - - - v - - - | — | — | 720° |
| | | Tf = 81° Téb = 93.8° | Liq. | Gas | | | |

This table shows that, as the level of applied energy increases, so does the number of molecules broken, as well as the amount of fragments generated, which means that the greater the disorder created (which increases the AS), the greater the quantity of CH4 generated and the greater the quantity of hydrogen rejected. Furthermore, the AH/AS ratio gives the temperature Tee, at which the reactants reach a natural equilibrium under a pressure of 1 bar. If only liquids are desired, the entire process occurs as if it were limited to 20 kcal/molecule, as previously indicated elsewhere. (By the same token, this also explains why an FCC with its catalyst regenerated at more than 700° C. will reject hydrogen and CH4. No catalyst may change this state de facto. It may only favor intermediary stages and their speed, enabling the reactants to achieve the thermodynamic equilibrium depending on the temperature of the reactor.)

Another characteristic of one embodiment is that it makes it possible to control the rate of conversion into liquid without creating excess quantities of light gas such as methane or ethane. We will attempt to provide an explanation that came to us during the different tests that we performed, in relation to the chemical irreversibilities (which, it appears, are not mentioned very often).

One of the characteristics of our process is basically the fact that it splits the molecules in two and begins anew in order to remain master of the process.

Some people may think that, in order to speed up the process, the solution is simply to implement more energy, which would actually generate a greater number of light molecules, as indicated in the preceding table, including a great quantity of gas, assuming that it would then be always possible to polymerize the same in order to return to liquids. However, it would be impossible to perform this operation in an appropriate manner due to the chemical irreversibilities (which no catalyst will be able to overcome).

In order to present the ideas, let's assume that we are considering the generation of liquids from methane, ethane, etc. In this case, our intention would be to carry out reactions such as:

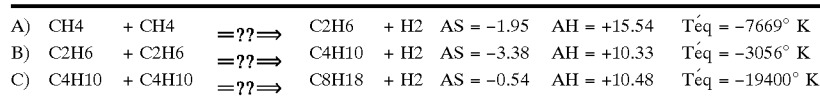

| | | | | | | | | |
|---|---|---|---|---|---|---|---|---|
| A) | CH4 | + CH4 | =??⇒ | C2H6 | + H2 | AS = −1.95 | AH = +15.54 | Téq = −7669° K |
| B) | C2H6 | + C2H6 | =??⇒ | C4H10 | + H2 | AS = −3.38 | AH = +10.33 | Téq = −3056° K |
| C) | C4H10 | + C4H10 | =??⇒ | C8H18 | + H2 | AS = −0.54 | AH = +10.48 | Téq = −19400° K |

THESE REACTIONS ARE IRREVERSIBLE since Teq NEGATIVE DOES NOT EXIST. It will never be possible to carry out the follow-up reactions in a reversible manner:

| | (A) | | (B) | | (C) |
|---|---|---|---|---|---|
| | Cn1 =?⇒ H2 + Cn2 | =?⇒ H2 + Cn4=?⇒ | | | H2 + Cn8 |
| Téb | 117° K | 184° K | 272° K | ! | 399° K |
| Normal state | GAS | GAS | GAS | 298° K | LIQUID |

Consequences
(1) It is necessary to accept the unavoidable creation of CH4 in this process, summarized by the overall reaction C':

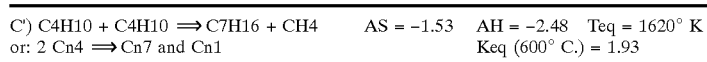

| C') C4H10 + C4H10 ⇒ C7H16 + CH4 | AS = −1.53 | AH = −2.48 | Teq = 1620° K |
|---|---|---|---|
| or: 2 Cn4 ⇒ Cn7 and Cn1 | | | Keq (600° C.) = 1.93 |

(This reaction is possible because Teq is positive)

(2) if the thermodynamic reversibility is violated with energy; according to the reaction C": hydrogen must be rejected C") $C_4H_{10} + C_4H_{10} \Rightarrow C_8H_{18} + H_2$   AS = −0.54   AH = +10.48   Teq = −19400° K (This reaction is possible because Teq is negative)
C"/Even the transition through the synthesis gas, which begins with the following reaction:

$CH_4 + ½O_2 \Rightarrow CO + 2H_2$   AS = +42.7   AH = −8.52, (reaction that may be explosive)
is irreversible and will lead to a poor efficiency overall in the liquefaction by methanol or Fischer-Tropsch.

C" may be carried out only with side reactions that produce $C_2H_2$, in particular.

PRACTICAL CONCLUSION: first of all, the generation of gases must be avoided, which is precisely what our process does.

Carbon Deposits

Our experience in controlling the appearance of coke led us to assume that there were two main sources: massive deposits through the polyaromatic nuclei; and pulverulent carbon through the gases.

It is quite easy to visualize that if the matter is polymerized into numerous contiguous polyaromatic nuclei, since the carbons are directly bound to each other and comprise few or no hydrogen links as previously seen, the fusion temperature increases with the number of nuclei and the reduction of the H/C ratio ($C_{10}H_8$ Tf=80° C., $C_{20}H_{12}$ Tf=278° C., etc.); we are getting increasingly closer to a solid coal.

This can also be examined, for informational purposes, with our method for the study of chemical irreversibilities.

In order to present the ideas, let's take some benzene and attempt to crack it. A fusion of molecules is observed, accompanied once again by a rejection of $H_2$, according to the following reaction:

| | | | |
|---|---|---|---|
| [1] | Ä + Ä ⟹ Ä>-<Ä + H2 | −1.17 | 3.46 |
| | This reaction is irreversible since Teq cannot be negative. The following fatal side reaction must be added: | | |
| [2] | Ä ⟹ 6Cgas + 3H2 | +259.4 | +1010 |
| | To obtain AS = 0.0, it is necessary to take 1.17/2.59 from reaction (2), or: | | |
| [3] | 0.0045 Ä ⟹ 0.0045 6Cgas + 0.013H2 | +1.17 | +4.55 |
| | Resulting in the global reaction: | | |
| [1] | Ä + Ä ⟹ Ä>-<Ä + H2 | −1.17 | +3.46 |
| + | | | |
| [3] | 0.0045 Ä ⟹ 0.0045_6Cgas + 0.013H2 | +1.17 | +4.55 |
| | 2.0045 Ä ⟹ Ä>-<Ä + 1.01.H2 + 0.004(6Cgas) | 0.00 | +8.01 |
| | and the return of 6Cgas in Csol = Coke | | |
| | 0.0046Cgas ⟹ 0.004.Coke | −1.16 | −4.55 |
| | 2.0045 Ä ⟹ Ä>-<Ä +1.01.H2 +0.004.Coke | −1.16 | +3.46 |

Experimental data 750° C. with 50% conversion in 40 s confirm the projected values found above and thus reinforce our belief regarding what must be avoided.

The notion of irreversibility provides for a good projection of the production of coke considered as the hardest side reaction.

The second way of appearance of pulverulent deposits of carbon is the acetylene way, of which some of the data are indicated below for informational purposes for $4CH_4$ engaged.

| | | | Teq ° C. |
|---|---|---|---|
| (21) $4CH_4 \Rightarrow 2 C_2H_6 + 2H_2$ | AS = −3.84 | AH = +31.08 | -///° K |
| (22) $4CH_4 \Rightarrow C_2H_4 + 2H_2 + 2CH_4$ | AS = +27.89 | AH = +48.66 | 1472° C. |
| (23) $4CH_4 \Rightarrow C_2H_2 + 3H_2 + 2CH_4$ | AS = +55.65 | AH = +89.95 | 1343° C. |
| (24) $4CH_4 \Rightarrow 4Csol + 8H_2$ | AS = +85.2 | AH = +71.4 | 565° C. |
| (25) $4CH_4 \Rightarrow 4Cgas + 8H_2$ | AS = 230.76 | AH = 793.16 | 3164° C. |

Note: TfdeC: sublimed at . . . 3379° C.

Thermal Decomposition of CH4

The reaction (24) indicates that, above 565° C. CH4 decomposes with slow kinetics, (approximately 1 hour towards 800° C.), as it is necessary to go through the gaseous state summarized by the reaction (25).

Therefore, the filtration that causes the appearance of the pulverulent carbon seems to be:

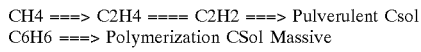

CH4 ===> C2H4 ==== C2H2 ===> Pulverulent Csol
C6H6 ===> Polymerization CSol Massive In any case and in practice:
(1) In all cases, the creation of saturated light gases must be avoided.
(2) The appearance of free hydrogen is a bad sign.
(3) The creation of unsaturated light gases and hydrogen constitutes an alarm.
(4) The creation of acetylene is a serious alarm.
(5) The monitoring of the aromatization through the refractive index is very useful in order to determine whether the processes are running correctly.

Emulsions

One of the characteristics of our process is that is uses oxygenated intermediaries which, when converted to steam, naturally produce stable water/hydrocarbon emulsions.

It has long been known that the combination of difficult fuels is greatly improved by the addition of 5 to 10% of water. This addition, during the first stages of the combustion, provides for the cracking of heavy molecules while avoiding their polymerization into polyaromatics, which would produce nodules of soot or pulverulent carbon.

On Aug. 5, 1997, ELF presented to the press a product called Aquazole, containing 10 to 20% water, indicating that the main problem was guaranteeing the stability of the mixture. Currently, this stability can only be guaranteed for 5 days to one month, despite resorting to a special mixing procedure and, in particular, thanks to special additives.

The interest presented directly by the intermediary emulsions produced by our process is understood, as these emulsions may become the main objective for these applications.

We have emulsions that are already 8 years old and are still stable: this shows that we control the difficulties encountered by ELF.

These benefits may be explained by internal molecular links that, at the anhydrous state, would be unsaturated and remained partially bound to water. It would also be possible to put forward all the oxygenated intermediaries that we presented previously in the control of the cracking operations towards 440–600x, which have a favorable equilibrium towards 200°–220° C., the operating temperature of our extractor.

In any case:
(1) We obtain stable water/hydrocarbon emulsions whose water content can be determined simply by setting, in our conversions, the ratio H2O/(X), in the gases used in our conversion, X being preferably CO2+Y; Y may be any gas N2, H2, etc. This means that the dry smoke (taken before 200° C. under 1 bar) resulting from a combustion is appropriate.
(2) The products formed (gasolines, especially kerosine) contain bound water.
(3) Limited to using only steam for reasons of simplicity and ease of implementation, our process makes it possible to obtain, depending on the settings selected: oxygenated and hydrated products; or primarily anhydrous products.

In fact, the useful recipes appear, when steam is used, in the form of emulsions that produce:
   a light emulsion referred to as "clear": d=0.89 to 0.92
   a heavier "mayonnaise" emulsion: d=0.93 to 0.96
   which are clearly separated from an excess of process water d=1.0 (if this excess exists, which is not the case in the example below).

The "mayonnaise" (of which 8 year old samples have not moved) is easily broken by different mechanical means such as a forced run through a series of crossworked pieces of fabric (an operation referred to as extrusion). The dry sand breaks the emulsion immediately; there are additional mechanical possibilities such as balls rolling in the emulsion, etc.

Below is an example of evaluation of the characteristics of these emulsions, with annotations:

| MAYONNAISE | Ptotal | Ptare | Net Weight | Dp/V | da | dn | n |
|---|---|---|---|---|---|---|---|
| Total Mayonnaise | 1700.0 − | 698.31 = | 1001.69 | 0.9656 | | 3.5 | 1.50625 |
| Extruded water | 1163.8 − | 444.13 = | 719.67 | | | | |
| Clear HC extruded | | | 282.02 | | | 13.0 | 1.50099 |
| Direct clear HC: | 731.36 − | 311.412 = | 419.95 | 0.8916 | 0.902 | 13.3 | 1.50310 |
| Total HC: | | | 701.97 | | | | |
| WATER/HC total ratio 719.67/701.97 = 1.02 | | | | | | | |

P: Weight in g
V: Volume in Cm3
Dp/V: Density = Weight/Volume
da: Density (read by densitometer)
dn: Deviation read by refractometer indicating the refractive index n.

With the operating conditions selected, which will be described elsewhere, the useful products did not contain any free water (aqueous phase d=1.0).

The distillation of the direct and extruded clear phase gave the following results:

DISTILLATION 1 Summary
WITHOUT SAND and without stirring

| Cut Ptot | Recipes Ptar | P.g | V.t | Volumes V. water | V. HC | Weight HC. sec | Dp/V | dn | N |
|---|---|---|---|---|---|---|---|---|---|
| PI–115 | 74.95 | 73.01 | 1.94 | 2.4 | 0.9 1.5 | 1.04 | 0.693 | 8.2 | 1.44963 |
| Regurgitate; | 93.11 | 75.02 | 18.09 | 20.2 | 3.0 17.2 | 15.09 | 0.877 | 12.3 | 1.49360 |
| 200–250 | 84.43 | 78.06 | 6.37 | 8.2 | — 8.2 | 6.37 | 0.777 | 9.5 | 1.46368 |
| 250–300 | 91.86 | 76.73 | 15.13 | 17.4 | 4.0 13.4 | 11.13 | 0.830 | 11.3 | 1.48297 |
| 300–360 | 115.28 | 77.01 | 38.27 | 43.8 | — 43.8 | 38.27 | 0.874 | 12.4 | 1.49466 |
| 360+ | 89.15 | 75.44 | 13.96 | 15.5 | — 15.5 | 13.96 | 0.901 | 19.3 | 1.56567 |
|  |  |  | 93.76 |  | 7.9 | 85.86 |  |  |  |

DISTILLATION 2 Summary
IN SAND and without stirring

| Flask: | 202.78 |
|---|---|
| Flask + Support: | 214.21 |
| Flask + Support + Feed: | 309.95 g |
| Feed: | 95.74 g |
| Sand 300µ: | 610.34 g to cover the liquids (total weight engaged) |

| Cut Ptot | Recipes Ptar | P.g | V.t | Volumes V. water | V. HC | Weight HC. sec | Dp/V | dn | N |
|---|---|---|---|---|---|---|---|---|---|
| PI–120 | 72.50 | 70.06 | 2.44 | 3.25 | 0.9 2.25 | 1.54 | 0.684 | 6.5 | 1.43112 |
| 120 | 72.8 | 72.50 | 0.3 | 0.3 | 0.3 — | — |  |  |  |
| 120–200 | 81.17 | 76.99 | 4.18 | 5.6 | — 5.6 | 4.18 | 0.746 | 8.2 | 1.44963 |
| 200–250 | 85.44 | 78.06 | 7.38 | 9.1 | 1.0 8.1 | 6.38 | 0.790 | 9.5 | 1.46368 |
| 250–300 | 95.14 | 72.87 | 22.27 | 26.1 | — 26.1 | 22.27 | 0.853 | 11.2 | 1.48191 |
| 300–360 | 119.05 | 72.99 | 46.06 | 53.0 | — 53.0 | 46.06 | 0.869 | 12.6 | 1.49677 |
| Total - - -> |  |  | 82.63 |  | 2.2 | 80.43 |  |  |  |
| Residue: 95.74 − 82.63 = 13.11 |  |  |  |  |  |  | 0.901 | 19.0 |  |

The abundant regurgitation in the first case, accompanied by a significant quantity of violently released water, shows that there is water bound with moderate chemical forces. During the distillation of the liquids submerged under the sand, there is a weaker "depolymerization" and a smaller release of water. In any case, this shows that: (1) The 262 g of hydrocarbons of the "mayonnaise" are capable of binding with the 719 g of extruded water, or 2.5 times its weight in water; and (2) The "clear and extruded" hydrocarbons already contain, in this case, from 3 to 9% bound H2O. Therefore, it can be seen that our process can naturally provide oxygenated compounds or stable water/hydrocarbon emulsions.

We checked that the exiting process water did not contain any alcohol or any other carbon compound, by processing its distillation summarized below:

PROCESS WATER ANALYSIS BY DISTILLATION with 15 Trays.

| Feed 100 cc: | 97.81 g |
|---|---|
| The traffic begins at 99° C. |  |
| distills between 100° C. and 101° C. | in clear water containing a small milky flocculating haze |
| Residue 225.93 − 224.89 = 1.04 g | Dark brown Non-combustible With small black nodules |

It is also observed that the water extracts different elements from the treated feed.

This water has an acid pH indicating that it has absorbed SH2 or any other acid element of the feed. All this constitutes a whole of favorable elements brought by our process, which implements steam of which the extractive activity increased with the injection temperature and the successive scrubbing operations in the extraction zone.

Control of Oxygenation or Hydration of Products

Other characteristics of the present system may include: controlling the hydration of the emulsions, or preventing the same; and controlling the oxygenation of the products, or preventing the same. We will indicate how these results can be obtained with our device. It should be noted that thanks to our extractor, we can select the norm of useful products and recycle those that are standout. Therefore, let's consider the norm case (selected objective) of oxygenated gasolines or gas oil and emulsion hydrated without free water.

It is clear that it is necessary to avoid sending too much process water to treat the feed, although a sufficient quantity must be sent. It was found that a good water/feed ratio (treated atmospheric residue) was in the order of 1 in weight. (Which is what was found in the evaluation of the results presented above.) If the objective is to move towards oxygenated compounds, it is clear that if said compounds are not oxygenated, they are considered standout, especially if the objective is to produce gasoline or automotive gas oil type cuts.

Therefore, we had the idea, which is a characteristic of one embodiment, to perform a first conversion of the atmospheric residue into distillation PI-360, with our extractor-contactor-decantor set around 200° C., and then rerun all these raffinates (200−) in their current state, through our facility.

In fact, during this recycling, equivalents of heavy but atmospheric distillates were converted into lighter gas oil, gasoline type products. The steam that provides for these operations is also sufficiently reactive to create the chemical additions that are shown in the distillation of the products (direct distillation or distillation under sand).

Let us now consider the reverse norm, for example to meet the refining specification of an existing site, which requires non-hydrated standard products (referred to as dry). Therefore, our process will void recycling the anhydrous products formed (200−), which would tend to hydrate them and create oxygenated compounds. In this case, we will operate by recycling only the extracts (200+) with the fresh feed that consists of residues or any other feed to be converted (200 being a value that may vary depending on the desired recycling).

In order to properly understand this, let's take a residue under vacuum that will not produce any atmospheric distillate during the first generation. It is appropriate to note that a very rough scheme is constituted by the following relationship:

RsV→DsV

DsV→Rat

A total RsV (parent) conversion test that gives a DsV (first generation), followed by a Rat (second generation) is detailed below. With this type of recycling and the selected settings, the conversion products were not hydrated, as indicated by their distillation carried out after the separation of water/hydrocarbon of the emulsions. Here, the distillation does not produce any water (contrary to the previous case, where an attempt was made to establish the same). This indicates that this problem is under control.

CONVERSION with EXTINCTION OF RECYCLING:

| End Conversion during Flow Useful Global Reference (3)–(4) | | | total depletion of resources Summary: | | | |
|---|---|---|---|---|---|---|
| Atm. Cut | Wt. | Dp/v | % Wt. | & % Wt. | dn | n |
| PI–150 | = 1.70 | 0.6872 | 3.49 | 3.49 | 6.5 | 1.43112 |
| 150–200 | = 3.89 | 0.7720 | 7.98 | 11.46 | 7.7 | 1.44420 |
| 200–250 | = 8.07 | 0.8200 | 16.55 | 28.01 | 8.2 | 1.44963 |
| 250–300 | = 24.96 | 0.8692 | 51.19 | 79.20 | 9.8 | 1.46691 |
| 300–320 | = 5.44 | 0.8685 | 11.16 | 90.36 | 11.5 | 1.48511 |
| Residue | = 4.70 | | 9.63 | 100% | | |
| Total - - - > | 48.76 | | | | | |
| (Losses: | 1.24) | | | | | |

The minutes of the distillation of the conversion products contained in the clear and extruded phase (see table I) show that there is no measurable release of water. The releases of white vapors or sputtering towards 80° C., 130° C., 150° C., 250° C., 290° C., clearly show the key points of water release that were readily encountered in the treatment that was aimed at achieving hydration and oxygenated products; but here they are quantitatively negligible. Their total may be evaluated by excess by stating that they are, at the most, equal to the losses observed, or 3.8%, for the explanation of the ideas. (It should also be noted that the transfer of samples from the recipe cylinder to the appropriate cylinder in order to take a more accurate measurement of the volume and weight to obtain the density Dp/v, is performed with losses of 0.3 g for highly liquid lights, reaching 0.75 g for the atmospheric cut 300+, and 2.15 g for the atmospheric residues, due to flow problems associated with the increase of viscosity and surface tensions. This gives an idea of the binding effect of the products on the walls, which increases with the density and the refractive index).

Finally, for information purposes, regarding these tests, it should be noted that the main characteristics of the residue under vacuum were: density 1.01, refractive index 1.594, solid state.

Reactors-Extractors and Product Distillation Devices

Our reports on the distillation of conversion products mention the "Regurgitation of products, inrush of released water, sputtering, etc., which, if they should occur in a classic distillation unit, would cause the "blowout" of all distillation trays and their packing. According to a new characteristic of one embodiment, we imagined a device that was not only capable of performing said distillation work without the above-mentioned problems, but also operated as a true reactor-extractor of the mixer-decanter type.

Figure 2:
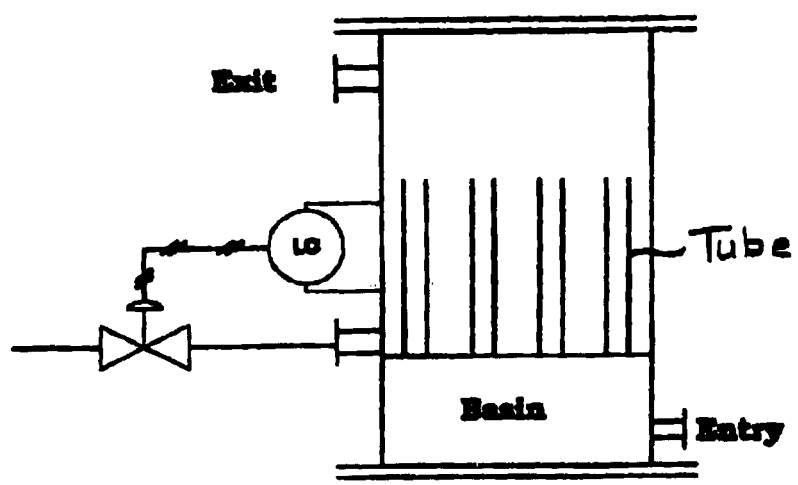
FIG. 2 is an illustration of an extractor/separator employed in one embodiment.

Referring to FIG. 2, the principle is as follows: the properly preheated or cooled products are sent into a double shell cylinder containing saturating water with steam, which sets the temperature of said shell simply by setting the pressure of the chamber; steam is produced when heat is released; steam is consumed when heat is absorbed; the presence of saturating water provides for significant transfers of heat with the inner container of the reactor-extractor.

In this double vertical shell that is quasi-isothermal to the temperature defined by the temperature of the saturating water, we install a tube or a series of vertical tubes, which rise, in order to explain the ideas, to the middle of the height of the double shell. Therefore, the upper section is empty. It acts as a baffle-decanter by selecting a low speed of ascent of light products or gases, enabling the heavy or liquid products in the form of mist or rain to fall back to the bottom. For this purpose, the falling speed of the heavy or liquid products only needs to be greater than the rising speed of the lighter products. Furthermore, this space acts as relief for any sudden inrush of water or violet release that could not be properly controlled. Since it is empty (no packing in this zone), there is no material risk. The heavy products or liquids remain at the bottom of the shell, between the shell and the vertical tubes. When the entire space between the shell and the tubes is filled, the heavy products overflow inside the vertical tubes and are collected at their lower outlet. Therefore, this extraction is automatic and natural.

The incoming products, liquids or gases, are injected at the bottom of the double shell in the heavy or liquid phase at a very moderate speed. Therefore, they are dispersed in the heavy phase, mixing therewith under local conditions of temperature and pressure; the mass transfers thus occur through the surfaces in contact and are governed by the differences of concentration in relation to the equilibrium of the stationary heavy phase and the incoming dispersed phase. These equilibriums are defined both by the physical separation of the phases in presence of each other and by the licit chemical equilibriums under the existing local conditions. The incoming products enrich the heavy phase and are drained of the heavy compounds transferred. With the light compounds that may be created, they reappear in the light phase that fills the top of the shell, where they are decanted, being separated from the liquid portions or heavy mists that fall back to the bottom. This device is especially beneficial because it is capable of performing the equivalent of a distillation while operating as if in a liquid-liquid extraction for oils or asphalts, or a chemical reactor. In fact, aromatic products such as furfural have widely known extracting powers for the extraction of aromatic products in the preparation of lubricants. In any case, it allows us to separate the effluents exiting the reactor at our convenience, in a safe and risk-free manner.

When several of these devices are arranged in series, a series of separations is performed which define perfectly the nature of the products extracted by the tubes, as the refined products are sent to the next device for the definition of another extract.

It should be noted that, with the working conditions used, the separation of atmospheric distillates from the atmospheric residue is carried out at 200° C. under 1 bar, while in a classic distillation column it would be performed at 360° C.

The configuration provided is for information purposes only and should not be limited thereto, as it could be carried out with numerous variations. For example, for our pilot of 2 kg/h, since the heat losses were very high, we adopted the electrical heating of the extractors, where the temperature was regulated by the intensity of the heater for a given rate and a given feed. The same system enabled us to perform the process extractions and the associated atmospheric distillations of our finished products in order to treat quantities of up to 50 kg.

This technological device can thus fulfill several purposes, in particular chemical conversions. We will explain its application to conversions of a gas mixture into liquids.

We just saw that our emulsions were stable and that the clear products could be oxygenated or hydrated, and that they were also in relation with the temperature (and operating pressure) of the key reactor-extractor separating the useful products from "the norm" of recycling. This unexpected effect motivated us to seek an explanation that could help us size the equipment and set the operating conditions while minimizing practical experimentation.

The Action of Steam on Unsaturated Double Bonds

Let's consider a chain containing a double carbon-carbon bond noted CeC. In the presence of steam, the following reaction may occur:

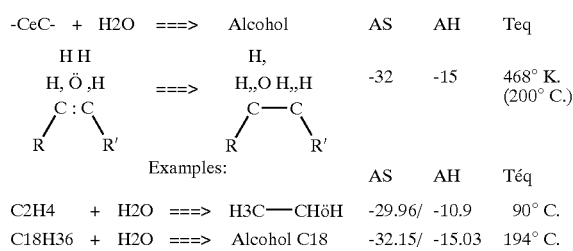

It is especially remarkable to note that, under these conditions, it is possible to convert ethylene into alcohol, which explains why we can limit the production of gases. It is also noted that heavy alcohols form naturally under the operating conditions of the reactor-extractor, which operates specifically at the temperature that is favorable to achieve this type of conversion.

It is thus easier to understand why our emulsions are stable and why our process can produce oxygenated compounds. In fact, regarding the stability of the emulsions, the heavy alcohols behave like third-party solvents between the water and the hydrocarbons, since alcohols are miscible with through their function öH, and with hydrocarbons through the basic hydrocarbon skeleton. When we consider the fact that the binding forces involved in the emulsion are weak because their origin is more physical than chemical, it is easy to understand that the emulsion can be easily "broken" by the simple mechanical means that we have discovered.

Metals with Inorganic Deposits/Complex Emulsions

The residue under vacuum that we converted contained the impurities summarized in the following table, which also indicates their distribution.

| FRACTIONATION of RsV, Kuwait by EXTRACTION C3–C5 | | | | | |
|---|---|---|---|---|---|
| POSITION | DAO C3 | Ex C4 | Ex C5 | Asp C5 | RsV |
| % RsV FEED | 18.7 | 33.7 | 30.4 | 17.5 | 100% RsV |
| Density 20° C. | 0.896 | 1.000 | 1.047 | 1.067 | 1.010 |
| Refrac. n 20° C. | 1.519 | 1.592 | 1.624 | 1.641 | 1.59415 |
| Tf ° C. Sediments | 50 | 60 | 100 | 146 | +41° C. 0.096% Pds |
| Res. Carb. % RsV | 0.62 | 2.96 | 8.09 | 8.23 | 19.9 |
| Sulfur % RsV | 0.53 | 1.62 | 1.62 | 1.23 | 5.0 |
| Nickel ppm RsV | 0.2 | 10.2 | 14.4 | 17.2 | 42 |
| Vanadium ppm RsV | 1.0 | 32.3 | 47.2 | 55.5 | 136 |
| NaCl % Wt. | — | — | 0.0003 | 0.0107 | 0.0110 |
| VISC. Cst 100° C. H/C | 1.64 | 1.35 | 1.22 | 1.18 | 1402 Cst H/C = 1.33 |

The combustion of heavy fuels gives ashes that typically have the following relative composition (off SO4):

Si2:32, Fe2O3:25, Na:16, Va:14, Ni:6, Al:6,

Our feeds to be converted thus contain Vanadium, Nickel, Sodium, Iron, Aluminum, Sulfur, etc., which must at least be taken into account in the conversion and should preferably be eliminated.

We observed that one of the first negative effects of the metals was the generation of solid compounds due to the formation of eutectics between 520x and 600° C., such as: $SiO_2 + Na_2O$, $V_2O_5 + Na_2O$, $V_2O_5 + NiO_2$, the most fusible acting as fluxing agent of the less fusible that follow.

It appears that the free compounds such as those indicated below are evacuated by the effluents of the reactor at the solid state.

| Compounds | Tf | Teb | D | n |
|---|---|---|---|---|
| SiO2 | 1700 | 2230 | 2.32 | 1.4840 |
| SiS2 | >1090 | | 2.020 | — |

In any case, if the operation is carried out with a reactor at a temperature that is too high, deposits are observed containing the eutectics that formed, which will deposit on the walls of the reactor. Therefore, this limitation has nothing to do with the chemistry of the conversion; it is only related to the nature of the impurities of the feed. In fact, it is not the presence of said impurities that constitutes a hindrance; it is their accumulation in the reactor or the extractor on duty that would tend to plug them, thus blocking any possible operation so long as they are not eliminated. Thus we have a new characteristic of one embodiment, which limits the operating temperature of the reactor depending on the impurity content, in the case of residue under vacuum below 500° C.

The SiO2 is slightly extracted by dry H2O steam (see table below).

| | Solubility SiO2/H2O P H2O liq., sat. | | H2O steam, sat. SiO2/H2O | SiO2/H2O ppm Dry H2O steam | | |
|---|---|---|---|---|---|---|
| Temp. | atm. | Concent. | ppm @ Tsat. | 400° C. | 500° C. | 600° C. |
| 100° C. | 1 | 500 | 0.02 | 0.2 | 0.5 | 0.9 |
| 200 | 15 | 1000 | 0.2 | 1.5 | 5.0 | 10.0 |
| 235 | 30 | 1300 | 1.1 | 4.5 | 11.0 | 40.0 |

Oxides such as V2O5 of a yellow red color or V2O3 of a darker color have a significant solubility in water, which contributes to their extraction in our extractor. The Vanadium-Sodium compounds such as NaVO4 or Na3VO4 are also soluble in water, the same is true for yellow NiSO4 or green NiCL3 and FeCL2. By extracting the different oxides, the water counters the formation of the eutectics mentioned above and also reduces the rate of their deposits in the reactor. The presence of water and the oxygenation of the hydrocarbons in our reactor contribute to the formation of compounds such as: C6H5SO3>2Fe, 3H2O (brown) or C6H5SO3>2Ni, 6H2O or C2H3Öö>2Ni (Green), which also have a partial, but significant, solubility in water.

All this explains the color of the water collected after the separation of water/hydrocarbons, as well as the appearance of flocs of a density greater than that of the water. After avoiding the deposits due to metals in the reactor, it was observed that they were concentrated in the heavy polyaromatic hydrocarbons that tended to form "cages", as shown clearly by the analysis of the residue under vacuum.

The following table describes a few compounds of Si and Fe exiting primarily in DsV and RsV.

| Compounds | PM | Tf | Teb | | d | n |
|---|---|---|---|---|---|---|
| H5C2)3,Si,C6H5 | 192 | 149 | 230 | | — | 1.5617 |
| H2CeCH,Si,(oC6H5)3 | 334 | — | 210/ | 7 mmHg | 1.130 | — |
| C6H5o>4,Si | 400 | 47 | 417/ | 7 mmHg | — | — |
| C6H5)2,Si,(C6H4C6H5)2 | 488 | 170 | 570 | | 1.140 | 1.100 |
| C6H5>3,Si,C6H4C6H5 | 412 | 174 | 580 | | — | — |
| C6H5>-<C6H4>)4,Si | 640 | 283 | 600 | | — | — |
| H3C)3,Si,C5H4>2,Fe | 330 | 16 | 88/ | 0.06 | — | 1.5454 |
| H3C)3,Si,C5H4>FeC5H5 | 258 | 23 | 65/ | 0.5 | — | 1.5696 |

This property is thus exploited to extract them at point 13.4 of our process, which constitutes another characteristics of one embodiment.

We also observed that even the light components that may have formed remained attached primarily to the silica or free carbon to form liquids with a boiling temperature PI-150° C., as indicated in the table below:

| Compound | Tf | Teb | D | n |
|---|---|---|---|---|
| H3C)4,C | −17 | +9 | 0.613 | 1.3476 |
| H3C)4,Si | — | +26 | 0.652 | — |
| H3CCH2)4,C | −33 | 146 | 0.754 | 1.4206 |
| H3CCH2)4,Si | — | 152 | 0.762 | 1.4246 |

TETRAETHYLLEAD FOR GASOLINE (for informational purposes, we point out the remarkable physical properties of the tetraethyllead.)

These are some additional organometallic compounds of iron:

| Compound | PM | Tf ° C. | Teb | N | Color |
|---|---|---|---|---|---|
| C4H6Fe(CO)3 | 193 | 19 | — | — | Yellow |
| C6H4SFe(CO)2 | 220 | 51 | Subl. | — | Light red |
| C5H9C5H4)FeC5H5 | 254 | 16 | — | — | Red Liq. |
| H3CÖC5H4)FeC5H5 | 228 | 85 | 87 | — | |
| H3CCO2C5H4)2,Fe | 302 | — | 114 | — | |
| C6H5C5H5>FeC5H5 | 236 | 110 | — | — | Red |
| ÖHCC5H4>FeC5H5 | 214 | 121 | — | — | Gold |
| HoÖCH2C5H4>2Fe | 302 | 140 | — | — | Brownish Red |
| C6H5C5H4>2,Fe | 338 | 154 | — | — | Yellow |
| HoC6H4C5H4>FeC5H5 | 278 | 165 | — | — | Gold Fluorescent Green Yellow |
| C6H5>2,C5H3>2,Fe | 490 | 220 | — | — | Red/Yellow |

They are normally liquid and extracted according to our processes, at 100 or 200° C.

All these explanations are provided only for informational purposes, in order to have an idea of the phenomena observed.

It was also observed that the highly polyaromatic molecules that could form cages, which would translate into a very high refractive index, had a strong solvent power capable of extracting the unwanted molecules. This explains our technique, which consists in maintaining in 13.4 a strong stationary liquid phase of which the activity is increased by the temperature; this phase also results from components of the residue under vacuum.

Observations Regarding the Final Stabilisation of the Products Formed

There is always a residue of products at low boiling temperature in the useful products such as:

| Compound | PM | Tf | Teb | d | n | color |
|---|---|---|---|---|---|---|
| H3CÖC5H4)FeC5H5 | 228 | 85 | 87 | — | — | — |
| H3CCO2C5H4)2,Fe | 302 | — | 114 | — | — | Red |

Alcohols are added to these compounds, reacting according to the following scheme:

—CeC—+H2O <->Alcohol AS=−32 AH=−15 Teq 200° C.

As a result, the final separation cannot be a simple distillation due to solid-dissolved/gas phase changes or when it follows a dehydration. In fact, what refiners refer to as a "water inrush" could occur, which destroys the packings of a classic distillation unit. In our reference distillations, we observed these effects at the above-mentioned temperatures, in the form of violent regurgiations, sudden dehydrations, sputtering accompanying releases of white vapors, etc. That is why we adopt our extracting device to carry out this final stabilization operation in total safety. This device enabled us to separate all of our products, or approximately one hundred kg, without encountering any problems.

Description and Performance of the Injection Associated with the Reactor

It was previously indicated that the role of the injector was to transfer the maximum usable energy contained in the vapors or the gases, the feed to be converted, on one hand, and, on the other hand, to create a close contact between the steam and the feed, preferably without any material contact with the metal walls.

Figure 3:
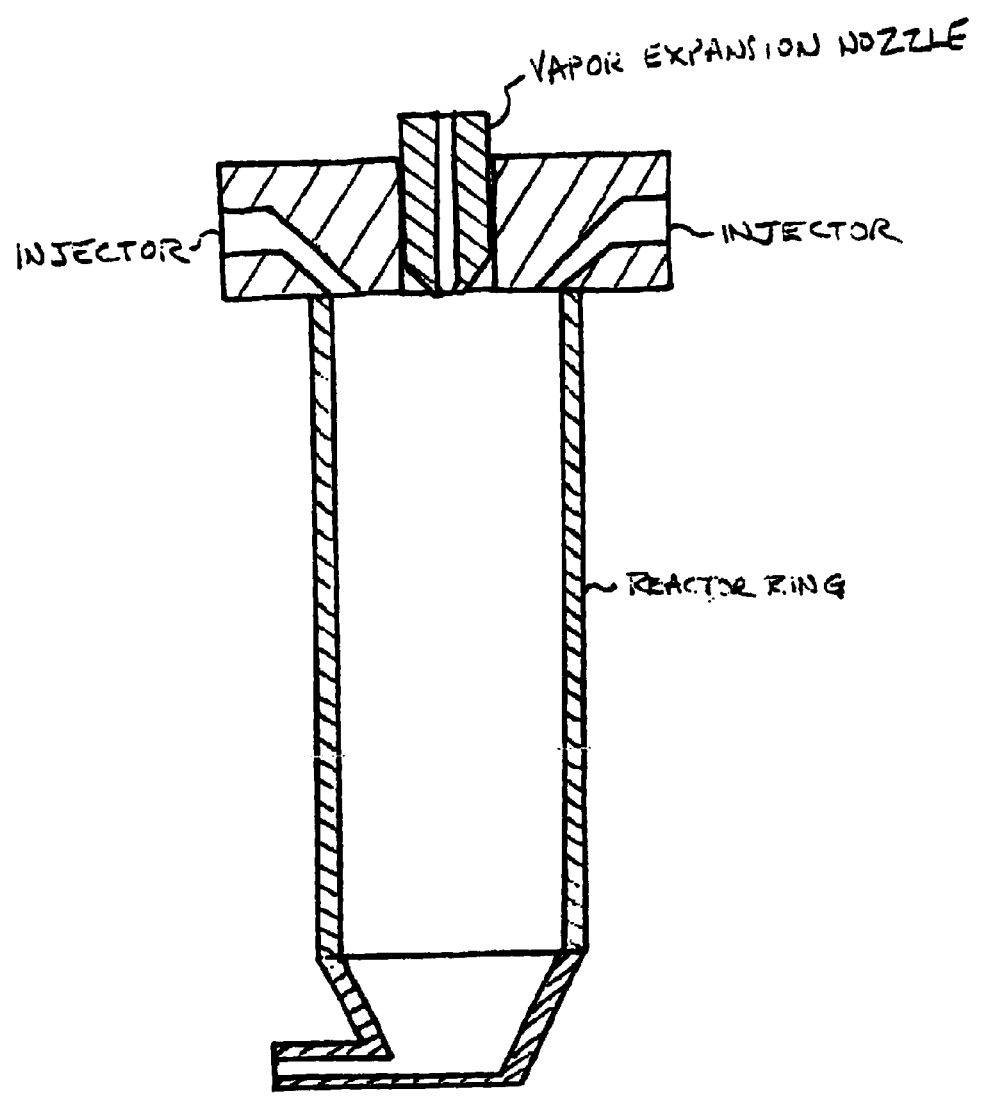
FIG. 3 is an illustration of a reactor employed in one embodiment.

These results are obtained as follows:

The feed that in fact is a heavy phase in relation to the gases or vapors, is divided into pairs of mechanically sprayed jets, set sideways in opposite directions, arranged in accordance with FIG. 3, flowing from top to bottom and meeting on the axis of the injector. By mutual deviation, they then flow axially at a moderate speed, without any material contact.

The purpose of the mechanical spraying is to create fine droplets, preferably some mist, which thus develops a maximum surface of the hydrocarbon containing feed. The spraying may be supported by approximately 5% of overheated HP steam which contributes to the nebulization of the feed (as is well known in the injector heads of boiler and furnace burners).

In this flow, the vapor or gas jet is placed during the expansion, its energy being primarily transformed into kinetic energy to the fullest extent possible, thus with great speed.

By injecting the high speed vapor jet in the sprayed jet of the feed, the mechanical shearing of said jet is obtained, with the transfer of energy that contributes to the activation of the reactions, all these operations being carried out at very high speeds, without contact with the material walls and practically at the desired temperature of the reactor.

The calculation of chokes and nozzles is easily performed, according to techniques that are specific to steam turbines or hydraulic turbines, taking into account the polyphasic state of the feed.

Arrangement of the Injectors on the Reactor to Facilitate its Mechanical Cleaning The reactor is empty. Most of the solid carbon formed is carried away by the effluents exiting the reactor, which constitutes a great benefit of our process. However, a small portion is deposited on the walls and tends to accumulate. Therefore, these carbonaceous deposits or metal oxide compounds contained in the feed must be eliminated at appropriate intervals. The presence of noncombustible oxides requires the use of mechanical means such as scrubbing, sandblasting, or another means. To this end, it is necessary to open the reactor while avoiding any inner part or jutting edge.

Therefore, the injectors are arranged sideways, opposite one another, to the outside of the reactor, in pairs, so that the reactor, once opened, may keep its walls totally free. By laying the top of the reactor, followed by the bottom, the naked ring of the reactor remains, which can be easily cleaned by any mechanical means.

This device is particularly beneficial, especially when compared to the problems presented by reactors fitted with packings (Visbreaker Soaker) or filled with catalysts with or without circulation.

Injector and Soaking Drum

A critical problem is knowing how to define the conditions for the injection of products so as to facilitate the proper initiation of the useful reactions, and define the required conditions in order to achieve the equilibrium of the stable products exiting the soaking drum. This practical definition, which constitutes a unique concept of one embodiment, consists mainly in defining the key parameters that govern said process in a practical manner. We will describe an example where the residue under vacuum is treated for the purpose of obtaining a light gas oil, kerosin production.

We will first consider the residue under vacuum. Its density and refractive index provide us with valuable information regarding its structure, thanks to our know-how. An extraction of asphalts at C3, C4, C5 specifies this structure in terms of molecules to be treated. We will preferably take a global sample and perform a thermal stability test (or conversion by thermal cracking) that is moderate and easy to perform.

If RsV is the quantity of residue involved and operating at the temperature T, we observed that RsV disappeared, forming other products according to the following relationship:

$$d(RsV)/dt = RsV\ e^{-t/Ts} \quad Ts \text{ being a time unit}$$

For example, for the residue for which all conversions results will be given below, we found:

| Temperature T ° C. | 430 | 460 | 490 |
|---|---|---|---|
| Ts seconds | 700 | 140 | 40 |

Our experiences let us to think that this reaction speed was related to the disequilibrium between the composition of the products and that which would exist if things were left to develop without any time restrictions.

If RsVeq is the residue that would remain in equilibrium with all the products generated, we would obtain:

$$\frac{d(RsV)/dt}{(RsVeq - RsV)} = \frac{Ts}{To}$$

To being a time unit specific to each product.

Furthermore, the conditions of mechanical breakdown of the molecules that we have already explained in detail, are related to the interatomic cohesive forces of the component molecules and to the fact that the matter in question exceeds the acceptable maximum deformation.

This results in an effort E equal to: E=force×deformation. We believe that there is a general relationship between Ts and the temperature T, with R universal constant of perfect gases, in the form of:

$$Ts = To\ e^{-T(R/E)}$$

Thus we have a simple means of evaluating the value E, which we assign to our residue under vacuum. In fact, according to our hypotheses and considering two pairs of temperature measurements Ts(1), T1; Ts(2), T2, we obtain:

$$E = \frac{R(T1-T2)}{\text{£}(Ts(1)/Ts(2))} \text{ with } \cdot: \text{£ Neper logarithm}$$

In our case, with T1=430° C., Ts(1)=700s, T2=490° C., Ts(2)=40s, we find that the value of E is approximately 42 kcal/mol. This means that if we are not capable of engaging this energy, nothing will occur instantaneously in the reactor (it also means that if a much greater energy is transferred to the molecule, this molecule will be shattered).

We will now examine the preheating of the feed and the temperature of the reactor.

Having provided an effort of 42 kcal/mol without converting it into heat, the average molecule of RsV is broken into only 2 fragments due to the lack of energy. First of all, it is necessary to prevent the two fragments produced from immediately rejoining. Again, this is the role in the injector, which inserts gaseous molecules during the expansion between the fragments formed. This insertion is facilitated by the fact that the Steam H2O or gas CO2 can react chemically with the broken ends of the molecules.

According to one embodiment, in order to achieve this with almost total certainty, it is necessary to have as many gaseous molecules as there are pairs of carbon, so as to create this situation. If steam is the only element used, the ratio between water (18 g/mol) and hydrocarbons (CH×13 14) must ideally be in the order of 18/(2×13) by weight, or approximately 0.7.

Since the molecules of RsV are fragmented, it is necessary to place them in a stable thermodynamic equilibrium. To this end, a period of time Ts is required, which depends primarily of the temperature. Based on the experimental data Ts, it would be preferably to adopt the highest possible temperature in order to reduce the duration of the operations, but we found out that this cannot be done without incurring risks.

Thus, from

460° C. we have: Ce14H28→Cä13H24+CH4

565° C.:CH4→4Csol+8H2 the polyaromatic polymerize towards massive carbon.

Thanks to the reactants used, primarily steam, these side reactions can be blocked partially but never completely. The final choice thus becomes a compromise based primarily on the solid carbon accepted. In practice, it is negligible at 440° C. At 520° C., its accumulation is the reactor requires frequent scrubbing for its elimination, otherwise it can become a hindrance if nothing is done, possibly filling the reactor completely.

A temperature of 460–470° C. was adopted, which gave good results. It was observed that the pressure had a very beneficial effect on the speed of the reaction. Very important at the beginning, going from 1 to 20 or 30 b, this effect subsides thereafter, peaking towards 150 b, and decreasing above 200 bars. That is why we adopted pressures of 20 or 30 bars, which enabled us to divide approximately by 2 the times Ts that we would have at 1 bar. Therefore, at 470° C, we should have approximately 25 seconds to achieve the equilibrium in the reactor.

Regarding the control of the reactions, our objective is to break a molecule in two during each run. This requires a net value of 20 kcal/mol as indicated previously. If we supply 40 kcal/mol for the activation, it is sufficient to start from a feed preheated under 470° C. to obtain the desired result.

In fact, starting from this temperature which is slightly lower than the desired temperature of the soaking drum, when the activation energy is added, the molecule would have a thermal temperature that is greater than that which it would have in its normal state, but it breaks upon absorbing 20 kcal/mol, finally leaving it at the temperature desired for the remaining operations necessary to achieve the equilibrium.

Once that this is well understood, taking into account the previously defined flow rate of steam (or gas) that is necessary to effectively close the broken ends, it is possible to deduce the value of the enthalpy of the steam that is sent to the injector.

In order to achieve 470° C. in the soaking tank, taking into account the recirculations and the different energy transfer values achieved, it is necessary to consider superheating temperatures of the steam in the order of 600–650° C. for the RsV.

Once that the energy balance is achieved and the matter recycling is completed, it would be beneficial to adopt a steam pressure of the order of 60 b, superheated at 600° C. Our injection nozzle then relieves adiabatically the steam from 60 bars to 30 bars at 470° c., and placed 60 kcal/kg available mechanically as kinetic energy in the steam jet of the order of 700 m/s. Thus we obtain a steam at the desired temperature of the reactor. At this temperature, there is absolutely no risk of “roasting” the hydrocarbons, which receive the energy usable as kinetic energy, which will “shear” the hydrocarbons mechanically.

Typically, the preheating will be approximately 20° C. or 25° C. less than the temperature of the soaking tank, or approximately 445–450° C. This is particularly beneficial for the operation of the residue preheating furnace and prevents any coking problems. In fact, we know that visbreaker furnaces must heat this same type of residue towards 460° C., and that the coking risks appear above this temperature. With these operating conditions, we never encountered any coking in our furnace.

In any case, once that the steam flow rate and the operating rate of the unit have been set, the superheating of the steam and the preheating of the feed are adjusted to achieve the thermal balance defined by the temperature of the soaking drum. In practice, the preheating of the feed being set at 20 or 25° C. below the temperature at the outlet of the reactor, the flow rate of the heating fuel of the steam furnace is adjusted by the reactor’s outlet temperature.

The example that we provided above for the residue under vacuum can be generalised regardless of the feed. The main key parameter is the temperature of the reactor, which increases when the products are lighter. For example, with very heavy distillates under vacuum, we will have temperatures in the order of 500° C., which will increase to 520° C. for light distillates under vaccum or very heavy atmospheric gas oils.

EXAMPLES APPLICATIONS

FIG. 4 represents the process layout of a unit according to our process for the steam conversion of hydrocarbon containing products, in a non-arid country.

FIG. 5 represents the same layout implemented in a desert area poor in water resources.

FIG. 6 represents the same layout implemented in order to convert the excess gases of a drilling well or a refinery into liquids.

FIG. 7 represents an industrial pilot working at a total supply rate of 5 kg/h, or 2 kg/h atmospheric residue or 1.5 kg/h residue under vacuum. This pilot also converted heavy distillates and oils into light distillates.

Steam Conversion

Figure 4A:
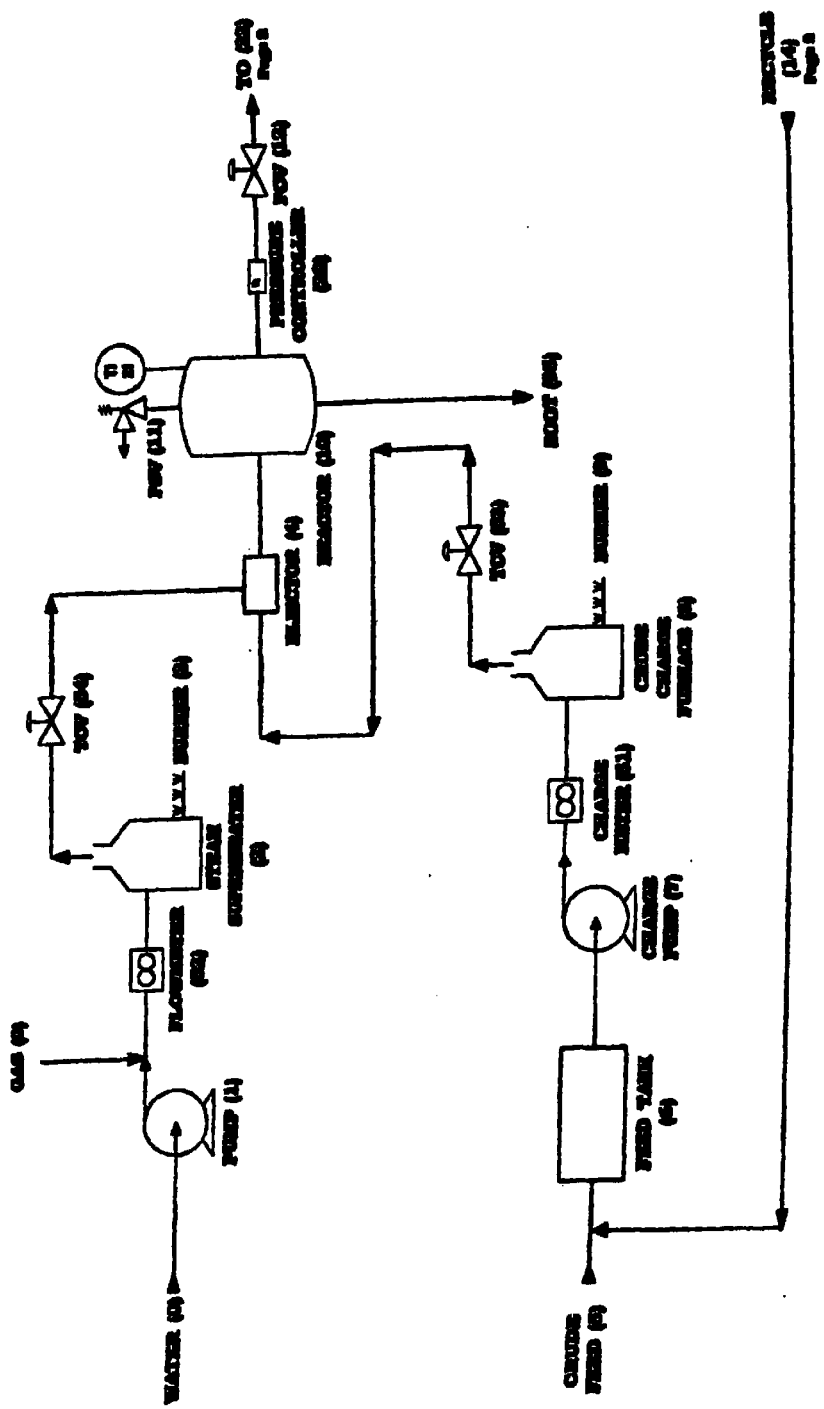
FIGS. 4A and 4B are an illustration of the process layout of a unit according to our process for the steam conversion of hydrocarbon containing products, in a non-arid country.
Figure 4B:
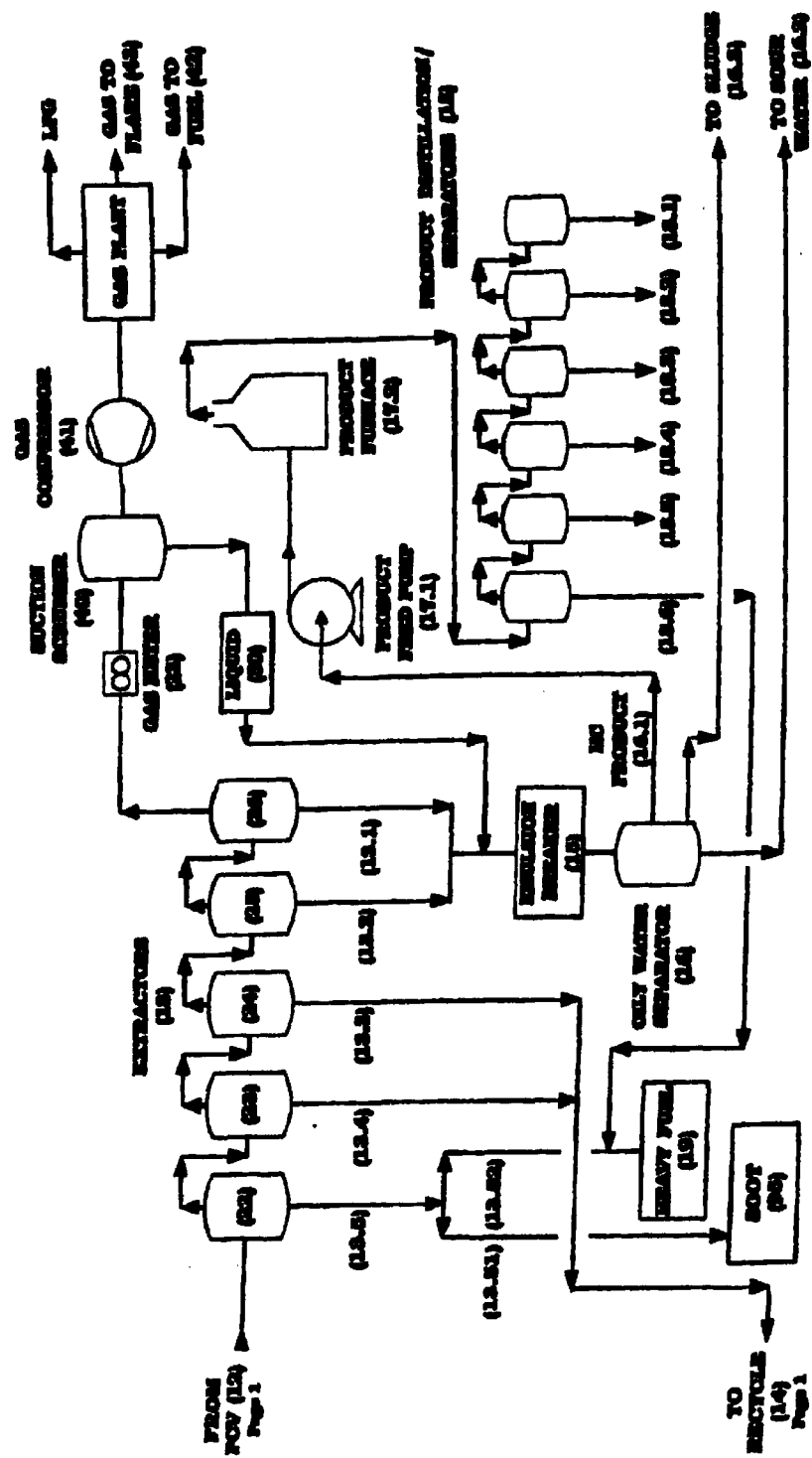

In this version, see FIG. 4, the water is introduced in [0] by the pump [1], in a single tube furnace [2] heated by a burner [3]; the superheated steam is sent to the injector [4].

The fresh feed [5] that is stored in the tank [6], which receives the recycling [14] into which it is mixed, is pumped by the pump [17], which sends it to the furnace [8], which preheats the whole and sends it to the inlet of the injector [4]. The injector [4], operating as previously described, injects the whole in the reactor [10].

Under the control of the pressure measurement [20], the valve [12] discharges the effluents of the reactor by releasing them in the extractor system [13], operating at a pressure similar to the atmospheric pressure.

This extractor system which was described elsewhere, comprises a series of extractions {13.1 to 13.5}, which are set from the ambient temperature to 360° c.

{13.1} is at the local ambient temperature, {13.2} is set towards 100° C., {13.3} is used to separate the useful products (generally atmospheric distillates) of the atmospheric residues that were not fully converted. The outlet {13.4} can also fulfill this purpose and, in all cases, it breaks down the final separation of {13.3}.

The outlet {13.5} extracts the heaviest products that are heavily loaded with polyaromatics and solid carbon precursor metals.

A portion {13.52} is extracted in order to prevent its accumulation in the facility, and is used to constitute heavy fuels as long as they are still acceptable in this fuel, while the remaining portion {13.51} is recycled in {14}, in preparation for a new conversion.

The useful products {13.2} and {13.1} appear in the form of highly stable emulsions. They are usually bound (but they could be separated if light products are desired) and sent to the system {15} which breaks the emulsions mechanically. These broken emulsions are sent to a classic decant which separates Hydrocarbons {16.1} from water {16.2} and the heavier phases extracted (mud and sediments) {16.3}.

The hydrocarbons fraction {16.1} is sent to the extractor {18}, which separates the hydrocarbons that may be oxygenated or hydrated. (A classic distillation would run the risk of dangerous "water inrush")

The normal outputs are:
{18.1} PI-100
{18.2} 150–200
{18.3} 200–250
{18.4} 250–300
{18.5} 300–350
{18.6} 350+ (Atmospheric Residue)

The cut points may be changed by modifying the temperature of the extractors, as explained elsewhere. The heavy fuels are constituted by the output products {18.6} (atmospheric residue) and the extracts {13.52}. The carbonaceous (laden with metals) {15} are used as fuels to feed preferably the burner {9} of the furnace {8} and the non-condensable gases are sent as primary fuel to the different burners of the furnace, the remainder being taken from the heavy fuel. Finally, the small quantity of noncondensable gas and the small carbonaceous deposits produces by the automconsumption of the unit are resorbed in this manner, which leaves the maximum quantity of liquid products demanded by the users.

In principle, this facility presents no danger. All prevailing reactions are endothermic, thus stable. The presence of process water steam makes it possible to smoother any potential risk of fire. The small production of gas does not give rise to any significant degassing, in the event of any incident.

The hold-up (quantity of matter retained in the reactors) is relatively modest, which provides for quick starts and shutdowns of the unit. The unit is automatically stabilized and self-regulating pursuant to the operating technique adopted, in particular the extractors that operate through the natural overflow of the extracts. All these qualities provide for an extreme ease of operation and conduct (especially when compared with the units that it can replace, such as an FCC with its catalyst circulation problems between the RISER reactor and its air supply regenerator under a pressure of approximately 3 bars, with its hydrocyclone problems in order to eliminate the fines of the catalyst, etc.).

Installation for Arid Areas

In no water is available, its absence can easily be compensated for through the use of hot gases issued from a simple combustion involving $CO_2+H_2O+N_2$.

Figure 5A:
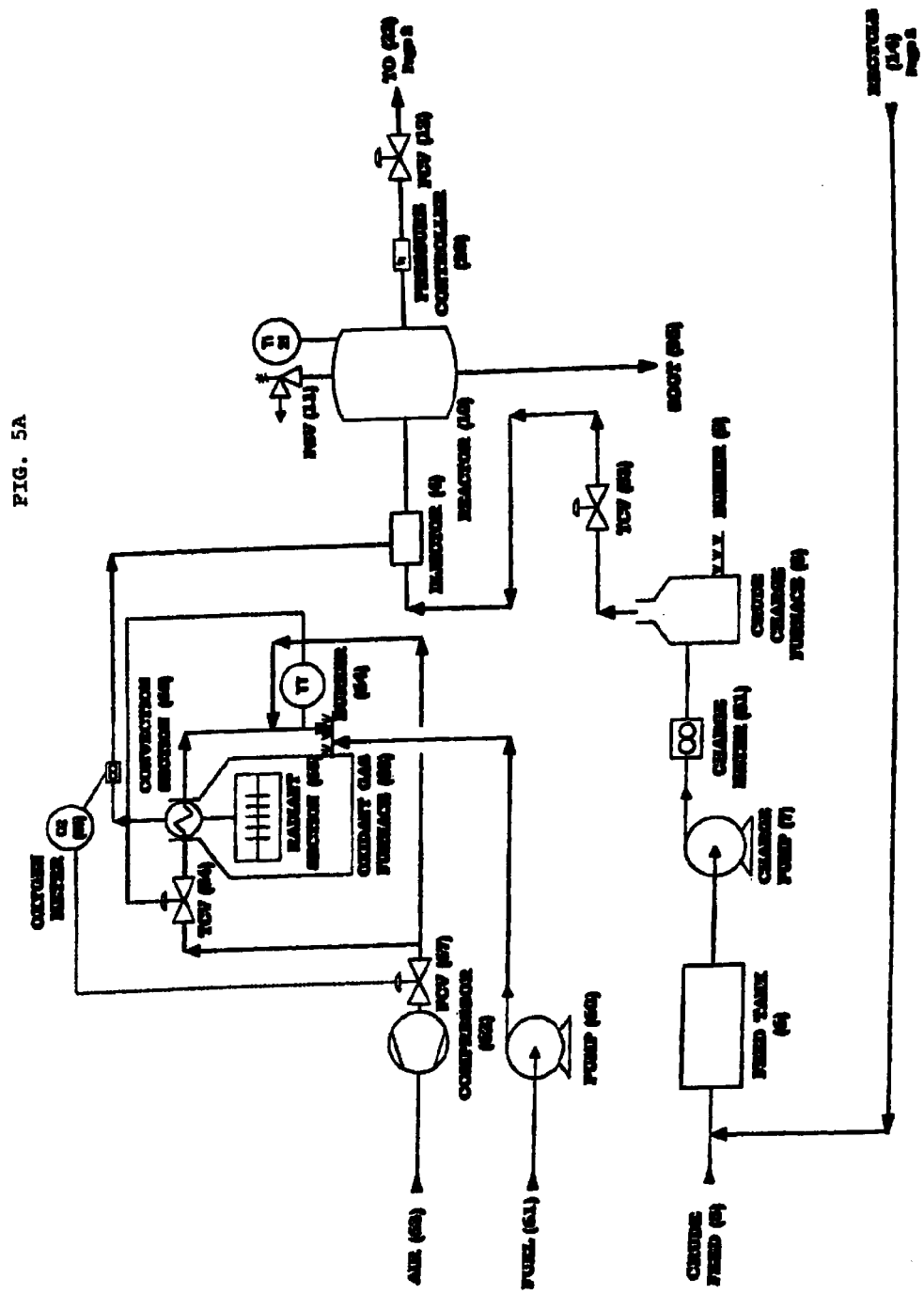
FIGS. 5A and 5B are an illustration of the same layout implemented in a desert area poor in water resources.
Figure 5B:
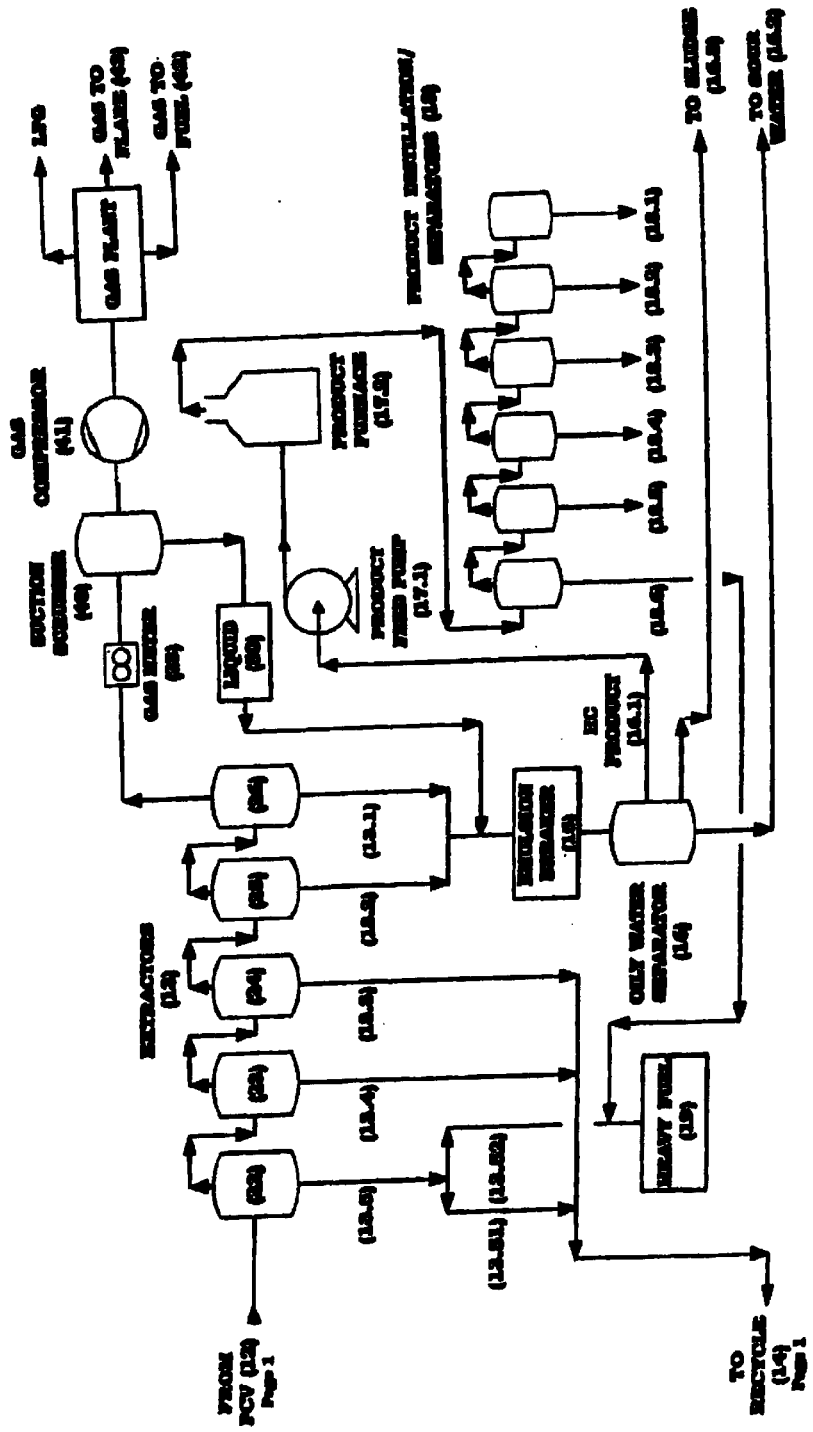

In this case, the furnace {2} of FIG. 4 is replaced by the furnace {68} of FIG. 5. This furnace receives the liquid (or gaseous) fuel {61}, which is pumped or compressed by {60}, sent to the burner {64} which also receives air {63} compressed by the compressor {62}, and is then sent as a fuel to the burner {64}. The temperature of the produced gases (fumes) is adjusted to the value required by bypassing more or less the convection zone that cools these gases mixed with the gas exiting the radiation towards 900° C., if it is properly charged thermically. In fact, the fuel flow rate is set according to the desired quantity of gas. An oxygen meter sets the oxidizer-air necessary so as to avoid any excess, while the preset temperature {54} of the gases to be supplied controls the bypass valve {67} that regulates said temperature. In this version, the quantity of water implemented is reduced compared to the case of FIG. 4, which operates completely with steam. The devices {15} and {16} are reduced but, in return, it is necessary to provide an air compressor that is more complex and less cost-effective in terms of consumed power than a supply pump of a water furnace. The rest of the facility remains identical to the previous one. This application is very simple and very safe.

It requires the constant monitoring of the combustion in the furnaces (flame detector) to prevent any untimely, uncontrolled combustion in the event that the flame goes out, which could cause the fusion of the reactor. (Note that the reactor may be decoked from time to time by the controlled air combustion of the carbonaceous deposits, as the solid deposits would then be easily removed by hammering or sandblasting.)

Figure 6A:
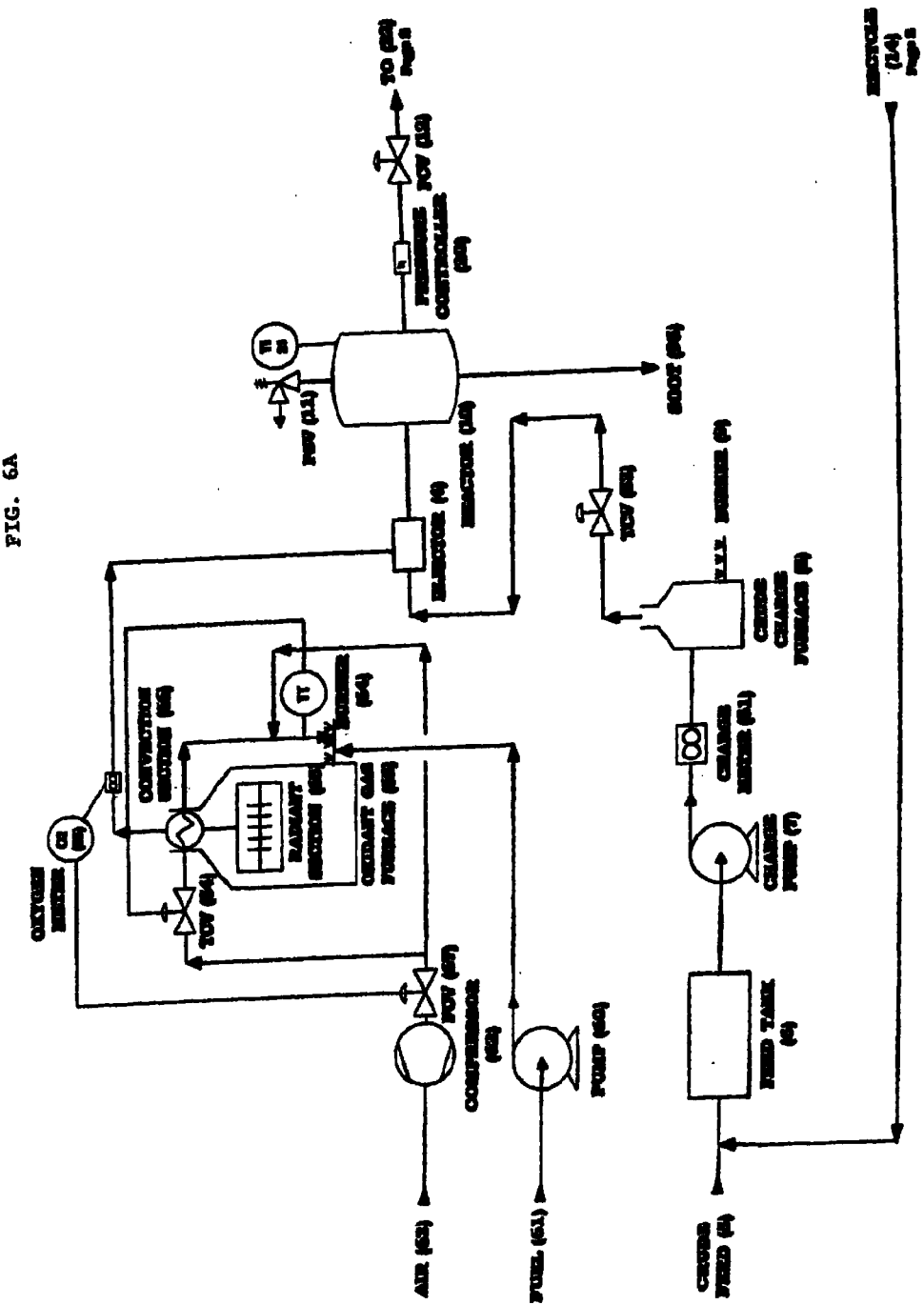
FIGS. 6A and 6B are an illustration of the same layout implemented in order to convert the excess gases of a drilling well or a refinery into liquids.
Figure 6B:
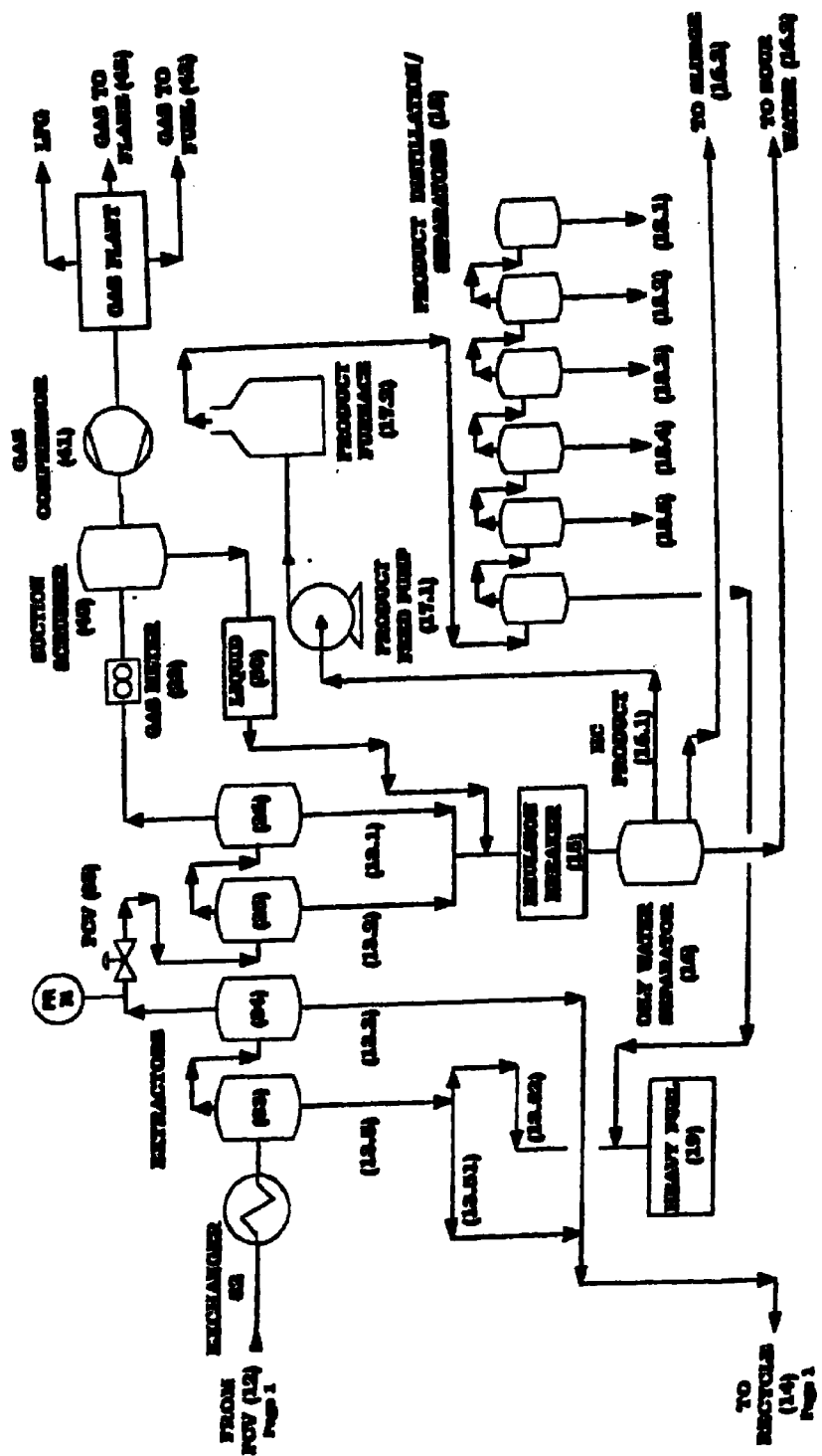

Resorption of Light Gases in the Refinery or in an Oil Field or to Maximize the Production of Gasolines This case is illustrated in FIG. 6. As we saw previously, the process goes through Oxygenating and Hydrating phases that are favorable towards 200° in the extractor. Instead of grafting H2O on the unsaturated bonds of the conversion products, it is possible to graft, under the same condition, —CH2— resulting from the initial high temperature reaction:

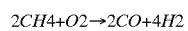

$$2CH_4+O_2 \rightarrow 2CO+4H_2$$

which, at 200° C., produces at a low temperature:

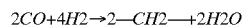

$$2CO+4H_2 \rightarrow 2-CH_2-+2H_2O$$

Since the nature of the gas is less important at high temperatures than the energy that is carries, this mixture is appropriate for the projected conversions of heavy products and, as was previously mentioned, their unsaturated skeletons constitute a good base for the attachment of the —CH2— that form favorably towards 200° C., under a pressure of 20 to 30 bars, in reactors that already contain hydrocarbons. A facility of this type is illustrated in FIG. 6.

From a schematic point of view, the generation of the gases is the same as in the case of FIG. 5. Only the regulation of the combustion changes. The oxygen meter is fitted with a device to measure CO2 which will ultimately regulate the oxygen (or air) fed to the burner.

The facility remains identical to the previous ones and the only difference is the outlet of the reactor {10}. The effluents exiting the reactor are not expanded and are maintained under a pressure of the order of 25 bars. They are cooled by an exchanger {82}, after which they go through an extractor {84} which operates in the same manner as {23} and {24}. {84} is under optimal temperature and pressure conditions to carry out the useful reactions and will be sized accordingly. With the pressure being regulated {74}, the valve {85} is operated, discharging the reactor {84}, returning partially to the initial process {13} here in {83} at the atmospheric pressure, and provided with the outlets {13.3}, {13.2} and {13.1}, which operate are provided previously in the case of FIG. 4.

The partial autothermic oxidation of the Gases requires the continuous monitoring of this combustion, as well as quick degassing means in the event of an incident (hydraulic protection and significant flare to handle any contingency). Our experience in this field leads us to think that this technique will be reserved for large units where all the required safety measures and precautions may be fully and efficiently taken.

In the gasoline target case, a more advanced gas or fuel oxidation may be adopted in order to obtain CO2+H2O (total oxidation) or CO2+H2O+CO+H2 (partial oxidation) mixtures that are favorable in order to improve the rate of conversion into light products and the octane number of the gasolines. In this case, the safety requirements of the facilities is once again total, with the usual refining techniques.

These three variations illustrate the flexibility of the possible adaptation of our process and the equipment that it implements, depending on the needs that must be fulfilled and the restrictions imposed.

EXAMPLES OF RESULTS OBTAINED WITH OUR INDUSTRIAL PILOT

Figure 7A:
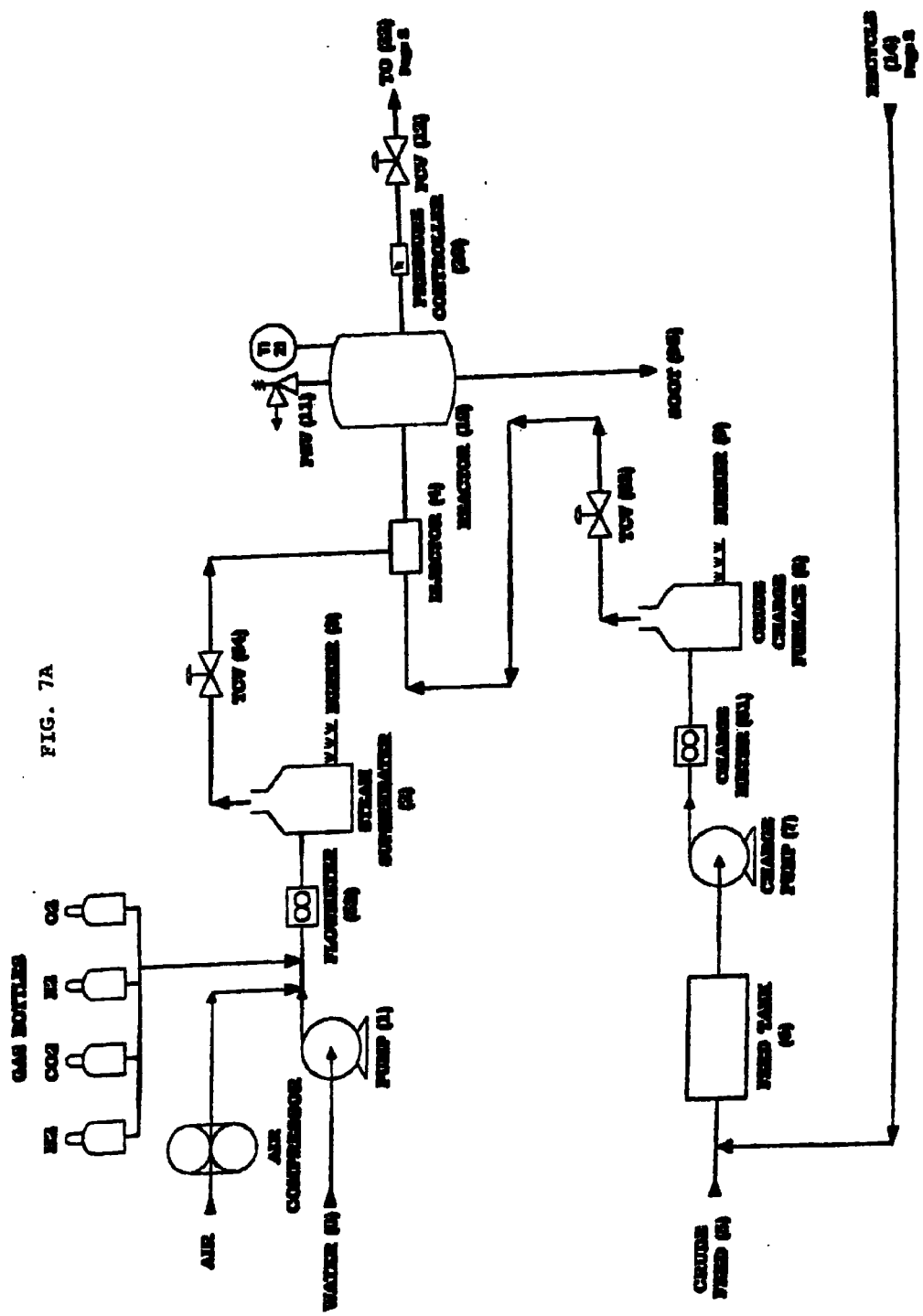
FIGS. 7A and 7B are an illustration of an industrial pilot for converting heavy distillates and oils into light distillates, wherein the pilot works at a total supply rate of 5 kg/h, or 2 kg/h atmospheric residue or 1.5 kg/h residue under vacuum.
Figure 7B:
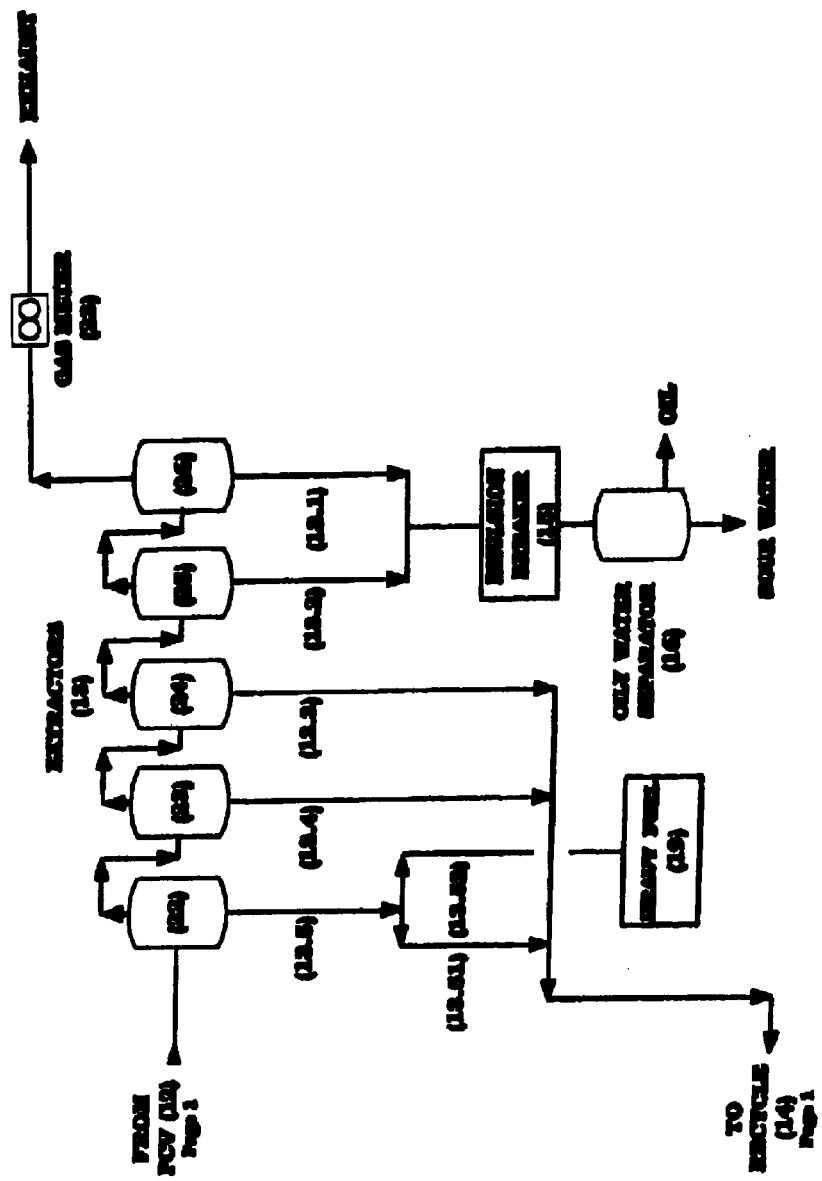
Figure 8:
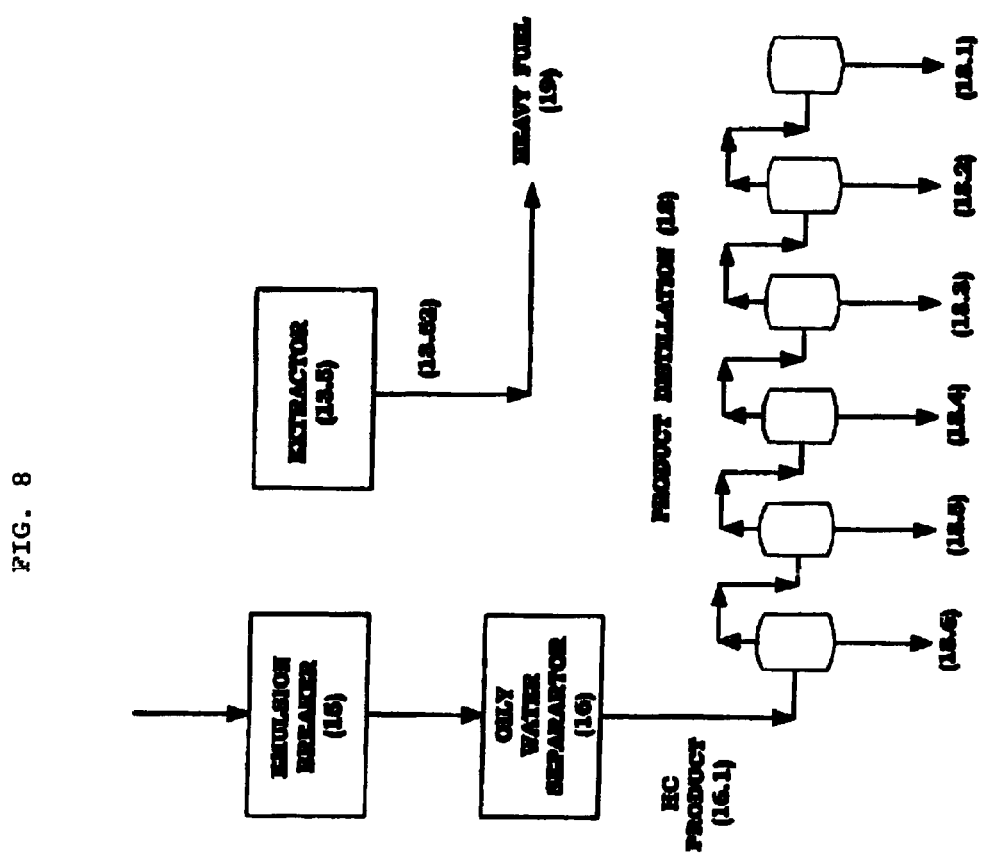
FIG. 8 is an illustration of a process layout in another embodiment.

Our pilot, of which an illustration is provided in FIG. 7, makes is possible to carry out all the operations that we have considered. For reasons of space and cost, the operations {15} and {16} for the separation and extrusion of hydrocarbons from the emulsions were not carried out on a continuous basis, but rather as a retreatment at the end of a controlled run according to the process layout in FIG. 8.

Figure 9A:
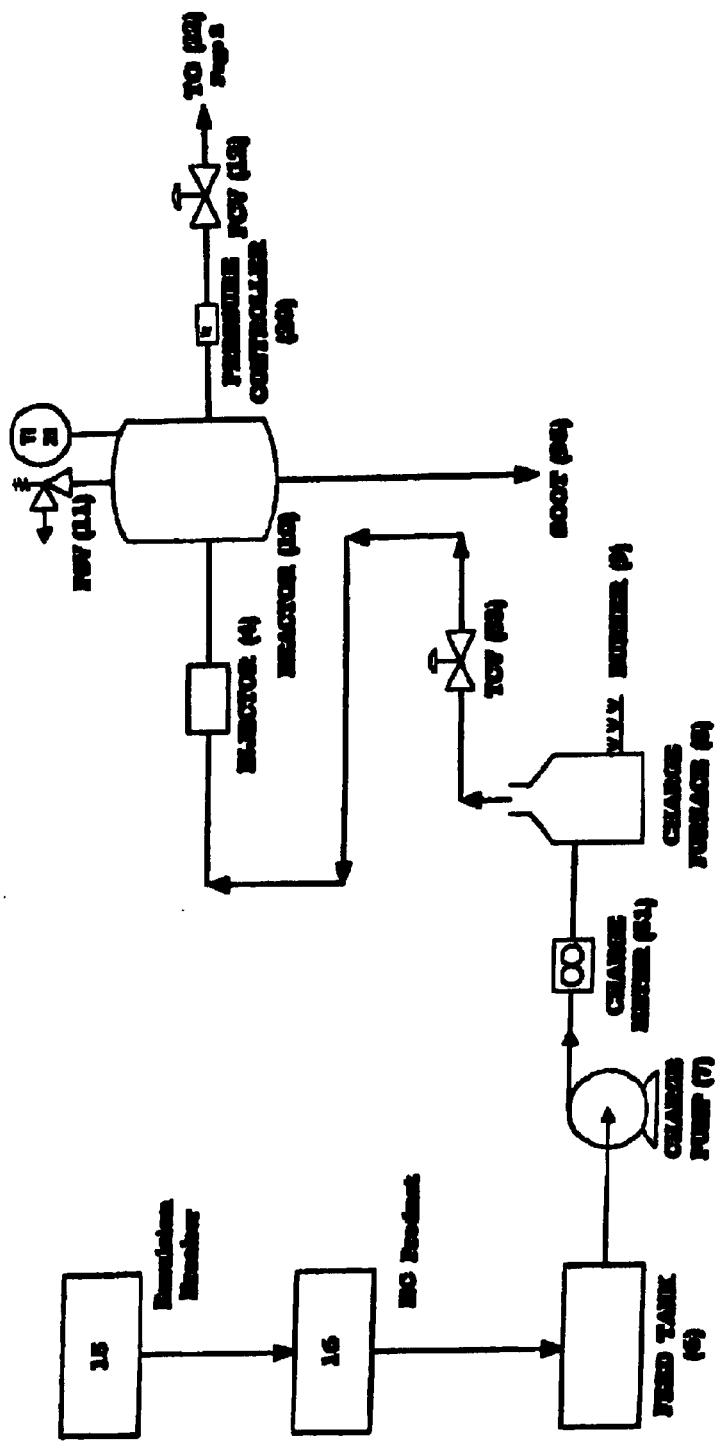
FIGS. 9A and 9B are an illustration of a process layout in another embodiment.
Figure 9B:
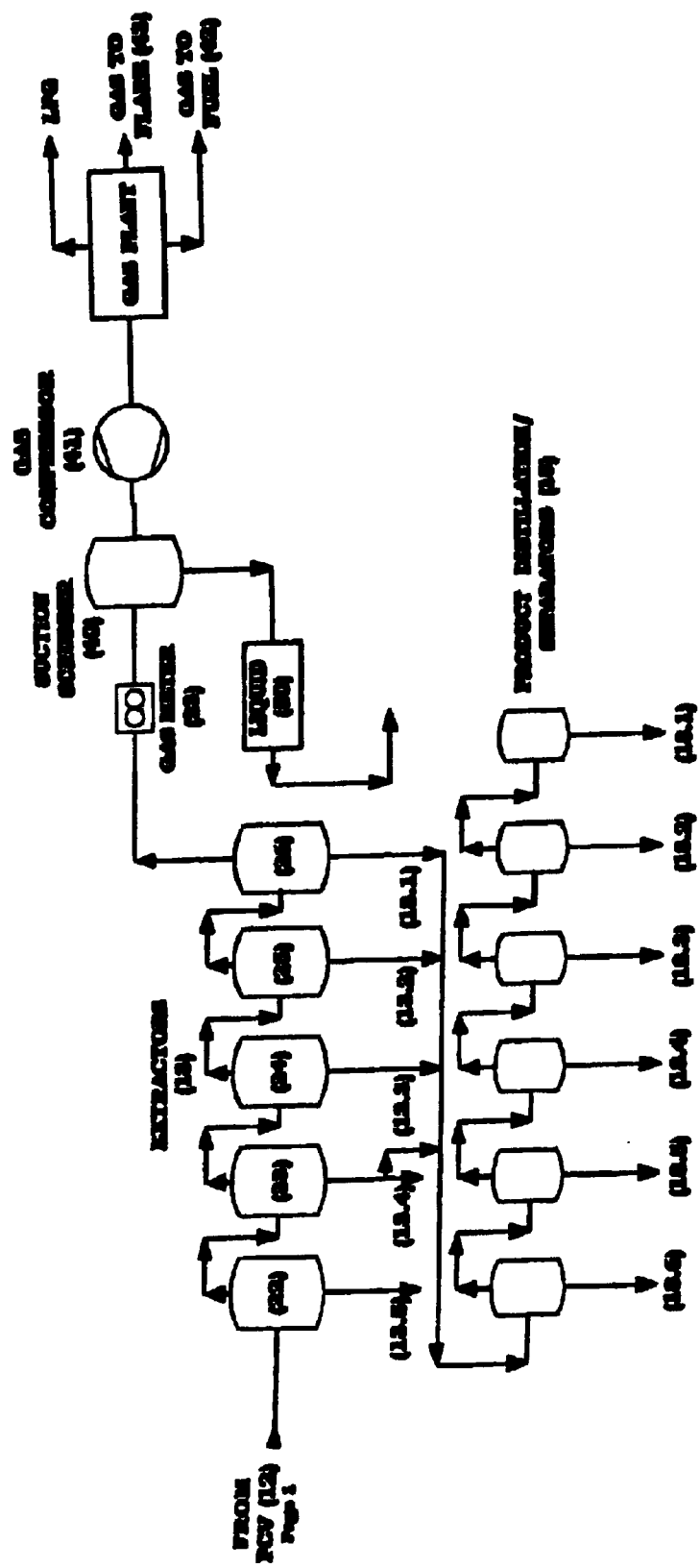

Likewise, the stabilization (some kind of reactive distillation) giving final product was performed as a retreatment and on a continuous basis in our facility according to the layout of FIG. 9. In this case, the reactor (atmospheric pressure) constitutes only a transfer line between the furnace {8} and the extractor {13}, which replaces the whole {18} of a facility completely in line according to FIGS. 4, 5 and 6.

The pilot comprises a manifold that provides for the charging of the gases H2, CO2, N2, air or CH4.

Figure 10:
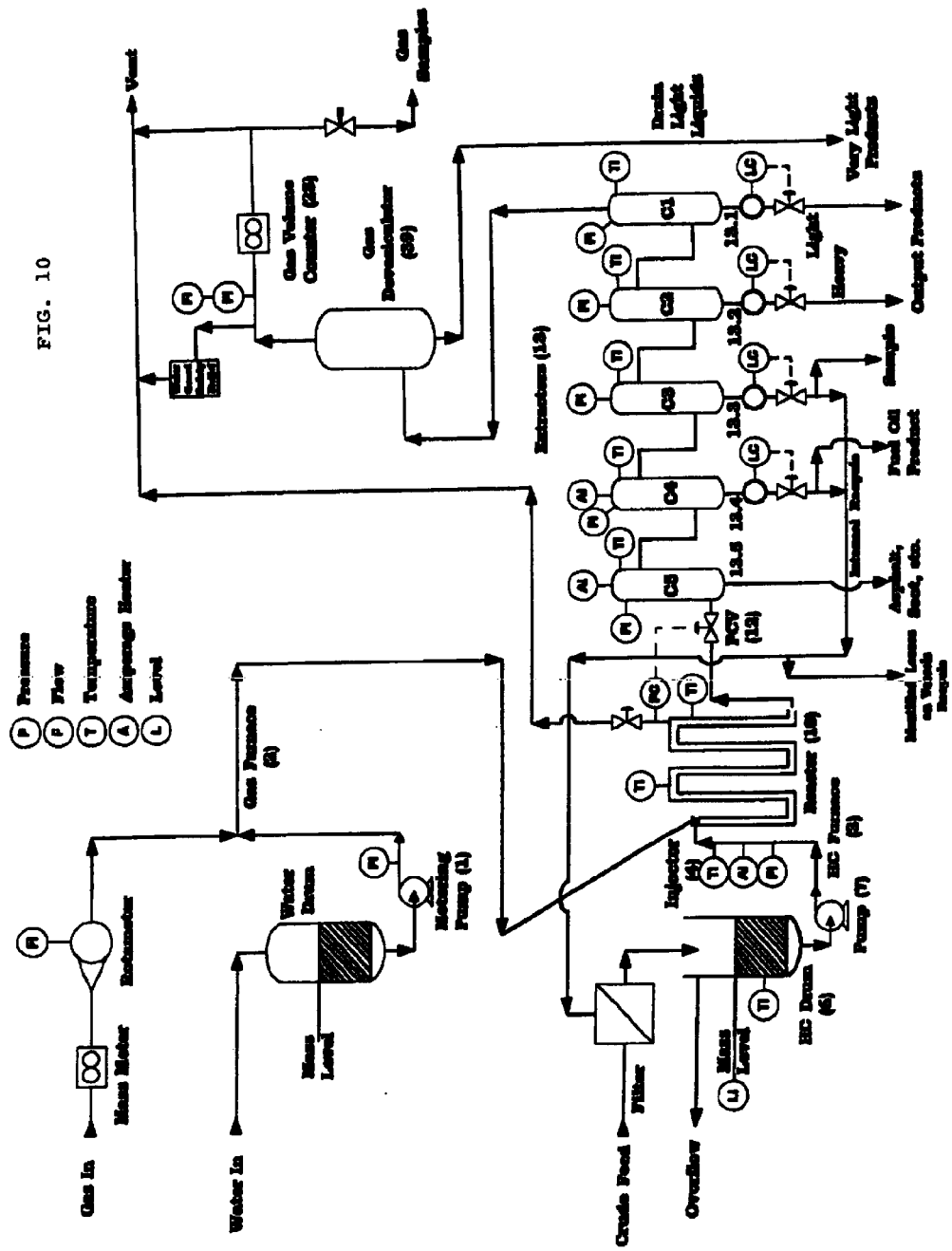
FIG. 10 is an illustration of an industrial pilot in another embodiment.

The pilot is illustrated in FIG. 10 in the form that is its simplest and closest to the industrial applications. It converts the feeds only with steam. {2} is the single tube furnace for the water. {1} is its booster pump that collects from a tank of which the level is measured in order to determine the water injected. {3} is the single tube furnace that heats the feed injected by the pump {7}. {6} is the fresh feed and recycling tank (which must be carefully monitored in order to keep the products liquid so that they may be pumped). This tank is measured with bubbles, which provides the weight of the treated feed. {4} is the injector that we described and defined previously. {10} is the reactor sized according to the method described in the patent. {12} is the discharge valve of the reactor, regulating its pressure. {13} is a set of extractors as we defined the same. Their temperature is set as needed from one extractor to the other. {28} is a Positive-Displacement Meter of outlet GAS placed behind a "devesiculator". {39} is another condensate collector. {13.1 to 13.5} are the extract discharge outlets.

The temperatures are measured by mercury thermometers placed in deep wells. The pressures are measured by conventional pressure gages.

Treatment and Measurement of Conversion Products Formed
Outlet Gases

The gases exiting {13}, after being "devesiculated" and cooled at the ambient temperature, go into a precision positive-displacement meter followed by a gas sampling system in flexible bladders of 11.2 liters (previously emptied by a vane pump that creates a very good vacuum).

The density of the gas can be determined by simply weighing the bladder (taking the taring into account), which, based on the volume of the gases produced, directly indicates the mass of the outlet gases. The composition of the gases sampled is obtained by any appropriate technique. In our case, since there may be several large capacity bladders, the gases may be extracted, cooled by liquefying them with liquid nitrogen, and distilled naturally during their reheating. If hydrogen was released in our reactions, it would be easy to find because it would not be trapped by the liquid nitrogen and would give permanent gases with a molecular weight of 2. This industrial procedure provides for an uncontestable quantitative analysis of the outlet gases.

From a practical point of view, the flow of gas makes it possible to verify the proper setting of the operating energy conditions of the injector and of the reactor that follows it, since we know that the production of hydrocarbon containing gases must be minimal (target: null). Therefore, the gases consist mainly of SH2, CO2 and CO, which can be easily proportioned through simple means.

Liquid Products Formed

These products appear after a very brief decantation, in the form of: a light mobile phase referred to as "Clear", a stable emulsion referred to as "Mayonnaise;" and a free water phase which sometimes covers the sediments or the flocculating sludge referred to as "flocs".

The proportion of these different phases or emulsions varies according to the feed and the operating conditions. The emulsion phase often prevails and can even be the only phase present. In all cases, the emulsion is extruded through previously described means, produces a "clear" phase (resulting from the mayonnaise) and "dirty" water (colored and acid). The direct clear phase and the mayonnaise clear phase constitute the outlet products in {16.11}, which contain the useful conversion products (which may be hydrated or oxygenated as previously indicated).

These products are then separated on a continuous basis, according to the process layout of FIG. 9. They are heated in the furnace {8} to 360× under approximately 1 bar, after which they go into {10}, which acts as a transfer line, to finally produce in: {13.5–18.5}, the atmospheric residue: {13.4–18.4}, the cut 300–360; {13.3–18.3}, the cut 200–300; {13.2–18.2}, the cut 100–200; {13.1–18.1}, the cut PI-100, The cut points can be changed by modifying the temperature of the extractors. We intentionally limited the cuts to 5 because they were sufficient in the first conversion phase of FIG. 7. Thus we obtain significant quantities of products on which all the evaluations and measurements desired may be performed.

The detailed characteristics of the formed products are obtained through classic distillation, without stirring or packing, in order to observe the dehydration phenomena of these products, which may release water. The refractive index and density measurements inform us of the structure of the formed products and, consequently, on the good execution of the conversion. This is especially important for recycling, by making sure not to polymerize any polyaromatics which would degenerate into massive coke.

Examples of Results Obtained

1 CONVERSION OF RESIDUE UNDER VACUUM, RsV

| [5] | Feed | RsV, feed | 100.0 | d = 1.01 | SOLID | n = 1.594 |
|---|---|---|---|---|---|---|
| [15] | Csol | | 3.0 | | solid fuel | 3% |
| [41] | Cgas | | 4.0 | | 2 fuel gas | 2% |
| [16.3] | + Miscellaneous | | 4.0 | | | |
| [13.52] | Purges | | 3.5 | | \Heavy | |
| [18.5] | | | 8.5 | | /FUEL | 12% |
| [18.1 to 18.4] | Dat: | | 77.0 | 0.839 | Atmos. DISTILLATES | |

| CONVERSION | Atm. Cut | % Wt. | Dp/V | n |
|---|---|---|---|---|
| [−18.1] | PI–150 | 2.57 | 0.687 | 1.43112 |
| [−18.2] | 150–200 | 3.77 | 0.772 | 1.45504 |
| [−18.3] | 200–250 | 4.61 | 0.825 | 1.46368 |
| | 250–300 | 46.68 | 0.8536 | 1.47443 |
| [−18.4] | 300–360 | 19.37 | 0.8535 | 1.48936 |

Dp/v is the Weight/Volume quotient density, da is the same density taken on a densitometer.

The key points of this conversion are listed below:

| Process Reference | Nature | d: density | n: refraction |
|---|---|---|---|
| [0] Feed: | H2O natural | 1.00 | |
| [5] | Feed RsV | 1.01 | 1.594 SOLID |

[13.1–13.2]

| [50] | | Dv/P | da | n |
|---|---|---|---|---|
| [16.1] | Clear | 0.893 | 0.906 | 1.51671 |
| [16.2] | Mayonnaise | 0.977 | . | 1.51252 |
| | Clear Extruded | 0.925 | 0.933 | 1.51567 |

[16.11: Clear + Clear Extruded from [13.1–13.2]]       % in the cut

| CONVERSION | Atm. Cut | % Wt. | Dp/V | n |
|---|---|---|---|---|
| [18.1] | PI–150 | 3.03 | 0.687 | 1.43112 |
| [18.2] | 150–200 | 4.44 | 0.772 | 1.45504 |
| [18.3] | 200–250 | 5.43 | 0.825 | 1.46368 |
| [18.4] | 250–300 | 55.00 | 0.8536 | 1.47443 |
| [18.5] | 300–360 | 22.82 | 0.8535 | 1.48936 |

Atm. Residue: 9.28

% in the cut

| | | DsV Cut | % Wt. | Dp/v | n |
|---|---|---|---|---|---|
| RECYCLING: MAIN FLOW | | | | | |
| [13.3] | 200° C. | PI–200 | 8.24 | 0.831 | 1.50099 |
| | | 200–250 | 29.21 | 0.903 | 1.50835 |
| | | 250–330 | 52.18 | 0.932 | 1.51879 |
| | | RsV.3 | 10.37 | | 1.595 |
| VERY LOW FLOW: RECYCLING + PURGE | | | | | |
| [13.4] | 360° C. | PI–195 | Nothing . . . | | |
| | | 195–250 | 8.63 | 0.859 | 1.49888 |
| | | 250–300 | 43.33 | 0.904 | 1.53737 |
| | | RsV.4 | 48.04 | | 1.625 |
| [13.5] | 470° C. NOTHING . . . | | | | |

It is observed that the cut [13.4] contains a RsV portion and (250–300) DsV which extracted metals and polyaromatics. A portion thereof is eliminated to purge the reactor. The 3.5% adopted gave us good results.

2 CONVERSIONS OF ATMOSPHERIC RESIDUE
Reactor 470° C.

| [5] | Feed | Rat., feed | 100.0 | d = 0.97 | Fixed | n = 1.5576 |
|---|---|---|---|---|---|---|
| [15] | Csol | | 1.5 | | solid fuel | |
| [41] | Cgas | | 3.0 | | 2 fuel gas | 1.5% |
| [16.3] | + Miscellaneous | | 3.0 | | | |
| [13.52] | Purges | | 2.0 | | \Heavy | |
| [18.5] | | | 9.5 | | /FUEL | 11.5% |
| | Total Atmos. Dist.: | | 81.0 | | on feed | |

[16.11: Clear + Clear Extruded from [13.1–13.2]]       % on feed

| CONVERSION | Atm. Cut | % Wt. | Dp/V | n |
|---|---|---|---|---|
| [−18.1] | PI–150 | 2.7 | 0.69 | 1.432 |
| [−18.2] | 150–200 | 10.6 | 0.77 | 1.452 |
| [−18.3] | 200–250 | 19.0 | 0.82 | 1.462 |
| [−18.4] | 250–300 | 33.2 | 0.86 | 1.484 |
| [−18.5] | 300–360 | 15.5 | 0.88 | 1.497 |

-continued

|  |  |  | Atm. Residue: 9.50 | | | |
|---|---|---|---|---|---|---|
| [5] | Feed: | Rat., feed | 100.0 % Wt. | d = 0.97 Dp/V | Fixed n | n = 1.5576 |
| [5] | Rat | DsV Cut |  |  |  |  |

|  |  | % in the cut | | |
|---|---|---|---|---|
|  | DsV Cut | % Wt. | Dp/v | n |
| RECYCLING: MAIN FLOW | | | | |
| [13.3] 200° C. | PI–200 | 6.95 |  | 1.503 |
|  | 200–250 | 28.14 | 0.867 | 1.509 |
|  | 250–330 | 49.45 | 0.923 | 1.530 |
|  | RsV.3 | 15.46 |  | 1.599 |
| VERY LOW FLOW: RECYCLING + PURGE | | | | |
| [13.4] 360° C. | PI–195 | 0.0 ... |  |  |
|  | 195–250 | 10.5 |  | 1.509 |
|  | 250–325 | 39.8 | 0.934 | 1.530 |
|  | RsV.4 | 48.04 | 1.06 | 1.630 |
| [13.5] 470° C. NOTHING ... | | | | |

It is clearly observed that the metals and heavy polyaromatics are concentrated in the RsV of the extract [13.4], which is why a portion of this extract is purged. The recycling decreases compared to the case where only RsV is treated; therefore, the treatment capacity is its nominal value of 2 kg/h of atmospheric residue.

3 Production of Oxygenated Compounds or Hydrated Emulsion

By performing a first conversion run of the Atmospheric Residue, direct clear products+emulsions are obtained. It was thought to run them again through our pilot in order to oxygenate or hydrate them during this new conversion.

The distillation under sand of the direct clear and extruded phase after this second conversion gave the following results:

| Section | V.t | Recipes: Weight Steam | V.HC | HC, dry | density Dp/V | refractive index n |
|---|---|---|---|---|---|---|
| PI–120 | 3.25 | 0.9 | 2.25 | 1.54 | 0.684 | 1.43112 |
| 120 | 0.3 | 0.3 | — | — |  |  |
| 120–200 | 5.6 | — | 5.6 | 4.18 | 0.746 | 1.44963 |
| 200–250 | 9.1 | 1.0 | 8.1 | 6.38 | 0.790 | 1.46368 |
| 250–300 | 26.1 | — | 26.1 | 22.27 | 0.853 | 1.48191 |
| 300–360 | 53.0 | — | 53.0 | 46.06 | 0.869 | 1.49677 |

H2O = 2.2 g for: 80.43 g of Dry HC

The distillation without sand of the same feed produced: H2O=7.9 g for: 85.86 g of Dry HC This clearly shows that hydrated and oxygenated products were formed, which depolymerize in the first place at similar temperatures comprised between 120 and 250° C. at 1 bar. Moreover, it is well known that water attaches to the ethylenic bonds according to reactions of the following type:

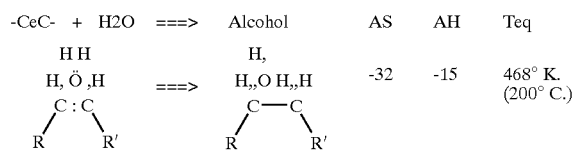

|  |  |  |  | AS | AH | Teq |
|---|---|---|---|---|---|---|
|  |  |  |  | -32 | -15 | 468° K. (200° C.) |

-continued

| Examples: | | | AS | AH | Teq 1b |
|---|---|---|---|---|---|
| C2H4 | + H2O ===> | H3C—CHöH | -29.96/ | -10.9 | 90° C. |
| C18H36 | + H2O ===> | Alcohol C18 | -32.15/ | -15.03 | 194° C. |

The equilibrium temperature of these reactions is achieved specifically at 1b towards 200° C. for heavy alcohols, and at 200° C. for light alcohols.

The experience clearly shows that we have oxygenated and hydrated hydrocarbons, which is confirmed by the chemical equilibrium temperatures of the water with the corresponding alcohols.

The presence of hydrated and oxygenated products is favorable for the quality of the products formed, in particular gasolines.

This oxygenation or hydration is also favorable for the combustion both in furnaces and in diesel engines. Furthermore, because of their polar characteristics due to the function ÖH, these products act as third-party solvents between the water and the hydrocarbon skeleton of the hydrocarbons, thus making it possible to obtain emulsions that are highly stable in time (Our samples of more than 8 years have not moved).

4 Conversion of the Last Heavy Distillation under Vacuum referred to as 80, Kuwait, from the Oil Plan BP Dunkenque Reactor 500° C.

These controlled operating conditions were selected in order to verify the productivity increase and test the control of the speed of deposits in the reactor. Furthermore, the techniques for the furfural liquid-liquid extraction of the feed and the effluents enable us to analyze the structure of the products formed and to confirm our operating and sizing practices for the units designed according to our process.

|  | Feed: | 80, K | 100.0 | d = 0.936 SOLID | n = 1.530 |
|---|---|---|---|---|---|
| [15] | Csol |  | 3.0 | solid fuel | 3% |
| [41] | Cgas |  | 4.0 | 2 fuel gas | 2% |
| [16.3] | + Miscellaneous |  | 0.5 |  |  |
| [13.52] | Purges |  | 3.5 | Heavy |  |
| [18.5] |  |  | 11.2 | FUEL | 14.7% |

-continued

| | | | % on feed | |
|---|---|---|---|---|
| Total Atmos. Dist.: | | 77.8 | on feed | |

[16.11: Clear +
Clear Extruded from [13.1–13.2]  % on feed
CONVERSION  Atm. Cut  % Wt.  Dp/V  n

| | Atm. Cut | % Wt. | Dp/V | n |
|---|---|---|---|---|
| [−18.1] | PI–150 | 10.49 | 0.692 | 1.429 |
| [−18.2] | 150–200 | 17.06 | 0.746 | 1.443 |
| [−18.3] | 200–250 | 17.26 | 0.786 | 1.465 |
| | 250–300 | 17.56 | 0.841 | 1.485 |
| [−18.4] | 300–360 | 15.43 | 0.878 | 1.509 |
| [−18.5] | Atm. Residue: | 11.20 | | |
| [5] Feed: | 80, K | 100.0 | d = 0.936 SOLID n = 1.530 | |

Extractive Separation with Furfural

| Cut: | P.AR | P.A | A-N | N-B |
|---|---|---|---|---|
| Dp/V: | 1.058 | 1.008 | 0.943 | 0.866 |
| n. | 1.610 | 1.575 | 1.529 | 1.489 |
| % Wt. | 13 | 21 | 21 | 46 |

| | | | d | n |
|---|---|---|---|---|

RECYCLING: MAIN FLOW

| [13.3] | | | 200° C. | 0.972 | 1.568 |
|---|---|---|---|---|---|

VERY LOW FLOW: RECYCLING + PURGE

| [13.4] | | | 360° | 1.02 | 1.591 |
|---|---|---|---|---|---|

A few Polyaromatics: non-extracted [13.5] 470° C. (returned in [13.4])

It is clearly observed that the heavy metals and polyaromatics are concentrated in the extract [13.4], which is why a portion of this extract is purged. The conversion is performed with a low recycling, thanks to the operating conditions adopted, in particular a reactor towards 500° C. Note that there is a very significant production of gasoline (27.55% weight PI-200° C., which compares very favorably with the FCC gasolines).

5 Conversion with Mixtures of Miscellaneous Gases and Effect of the Nature of the Feed on the Temperature of the Reactor In order to be able to work in arid areas where water is rare, or in order to improve the quality of the gasolines, we studied the alternative offered by our process, which consists of operating with miscellaneous permanent gases or mixtures that are easy to produce, such as furnace fumes, for example.

Some units, such as the decarbonation unit of the BENFIEL unit in a hydrogen production complex, reject large quantities of CO2 that we may consider using eventually.

Another one of our concerns was verifying our knowledge and our experience in working with light Distillated under Vacuum or heavy atmospheric Gas Oils in order to obtain lighter Gas Oils and Gasolines or, in other words, in order to satisfy the unbalanced market demand for these products. In fact, our unit makes it possible to favor the production of either gas oil or gasoline as desired, which cannot be achieved by the existing conversion units which have a fixed distribution of the products that they generate.

Therefore, we selected an ELF brand MOTOR OIL as the feed to be converted, which is popular and easy to find in all hypermarkets and has a density of 0.885 and an index n=1.488 (mean values).

We known that CO2 was a good candidate for the conversions; that CO2+H2O presented potential benefits; that CO2+H2 could be beneficial but H2 risked being poorly reactive and would participate in the reactions only through its physical attributes; that N2 could be adequate but, when it is used alone, would not protect against coking. All of these combinations were explored.

We were able to verify that it was very practical to adopt a reactor temperature of 520–530° C.

Without recycling, the conversions observed were as follows:

6 CONVERSION OF OIL TO PURE CO2 WITHOUT RECYCLING

| [5] | Feed: Oil | | 100.00 | d = 0.885 | n = 1.488 |
|---|---|---|---|---|---|
| [16.11] | CONVERSION | Cut | % Wt. | Dp/v | n |
| | | PI–150 | 6.74 | 0.700 | 1.432 |
| | | 150–200 | 8.62 | 0.750 | 1.448 |
| | | 200–250 | 8.99 | 0.807 | 1.464 |
| | | 250–300 | 9.35 | 0.824 | 1.476 |
| | | 300–360 | 9.49 | 0.836 | 1.487 |
| | Total Atm. Distillate | | 43.10 | | |
| | Rat | | 3.11 | 0.860 | |
| [13.3] | | | 52.79 | 0.878 | |
| [13.4] | | | 0.91 | 0.861 | |
| [13.5] | | | — | — | |

7 CONVERSION OF OIL TO CO2 + H2 WITHOUT RECYCLING

| [5] | Feed: Oil | | 100.00 | 0.885 | 1.488 |
|---|---|---|---|---|---|
| | CONVERSION | Cut | % Wt. | Dp/v | n |
| | | PI–150 | 8.53 | 0.727 | 1.433 |
| | | 150–200 | 8.93 | 0.760 | 1.447 |
| | | 200–250 | 11.56 | 0.798 | 1.463 |
| | | 250–300 | 8.34 | 0.816 | 1.474 |
| | | 300–360 | 7.70 | 0.832 | 1.487 |
| | | | 45.06 | | |
| | Rat | | 1.74 | 0.848 | |
| [13.3] | | | 52.63 | 0.880 | |
| [13.4] | | | 0.91 | 0.915 | |
| [13.5] | | | — | — | |

8 CONVERSION OF OIL TO CO2 + H2O WITHOUT RECYCLING

| [5] | Feed: Oil | | 100.00 | 0.885 | 1.488 |
|---|---|---|---|---|---|
| [16.11] | CONVERSION | Cut | % Wt. | Dp/v | n |
| | | PI–150 | 3.91 | 0.762 | 1.441 |
| | | 150–200 | 7.54 | 0.732 | 1.450 |
| | | 200–250 | 10.14 | 0.789 | 1.464 |
| | | 250–300 | 9.58 | 0.812 | 1.475 |
| | | 300–360 | 14.56 | 0.828 | 1.484 |
| | | | 45.73 | | |
| | Rat | | 13.67 | 0.848 | |
| [13.3] | | | 38.30 | 0.880 | |
| [13.4] | | | 1.40 | 0.686 | |
| [13.5] | | | 0.9 | 0.885 | |

H2O tends to slow down the appearance of the light fractions, as expected. There are no significant differences separating the performance of these gaseous mixtures.

From the octane number's standpoint, the classification is made in ascending order of CO2, CO2+H2O, CO2+H2, without any major distinctions. Care must be taken to avoid an excess of gaseous flow CO2+H2O, which would reduce the conversion as pure losses.

9 CONVERSION OF OIL TO CO2 + H2O WITH RECYCLING

| [5] | Feed: | MOTOR OIL | 100.00 | d = 0.886 | n = 1.49148 |
|---|---|---|---|---|---|

-continued

| | | | | | |
|---|---|---|---|---|---|
| [15] | Csol | 0.5 | solid fuel | 0.5% | |
| [41] | Cgas | 3.2 | fuel gas | 1.6% | |
| [16.3] | + Miscel-laneous | 0.0 | | | |
| [13.52] | Purges | 0.5 | \HEAVY | | |
| [18.5] | | 6.3 | /FUEL | 6.8% | |
| [18.1–18.4] Dat: | | 89.5 | Atm. DISTILLATES | | |

| CONVERSION | Atm. Cut | % Wt. | Dp/V | n |
|---|---|---|---|---|
| [−18.1] | PI–150 | 16.79 | 0.721 | 1.427 |
| [−18.2] | 150–200 | 13.24 | 0.763 | 1.445 |
| [ | 200–250 | 18.43 | 0.811 | 1.462 |
| −18.3] | 250–300 | 18.24 | 0.831 | 1.478 |
| [−18.4] | 300–360 | 21.80 | 0.868 | 1.489 |
| [13.3] | | | 0.882 | 1.507 |
| [13.4] | | | 0.897 | 1.511 |
| [13.5] | — | — | | |

This oil is converted to 30% gasolines PI-200.

These different examples show that very different feeds may be converted in a very safe manner and with excellent outputs. (The tests with pure N2 showed that there was a significant coking tendency.)

10 Deposits in the Reactor

We selected the ELF Motor Oils as test feeds in examples 6, 7, 8 and 9, thinking in particular that we would be only limited by chemical considerations for an analysis of the conversion of light cuts. We essentially performed the conversions with permanent gases, in particular the CO2 and hydrogen supplied by Air Liquide, and Demineralized Water available commercially, with a furnace temperature of 530° C.

We began proportioning the deposits by controlled combustion according to the technique that is specific to hydrocarbons, while closely monitoring the combustion front. Unexplained problems remained regarding local feed losses in the reactor.

Therefore, we decided, after a long controlled run: (1) to carry out a careful combustion; and (2) to open the reactor and its injector. The injector was clean.

We then extracted deposit scales from the reactor, through the well-known hammering technique, and a gray powder by spinning with a deep-hole drill. Neither the scales nor the powder were combustible.

151.2 g of solids were collected for a feed of 62300 g, which gives solid deposit/feed ratio of 0.24%. The origin of these deposits can only be the oil treated and they appeared only as an accumulation.

(In our residue conversion tests, we adopted the mechanical scrubbing technique to extract carbonaceous and solid residues from the reactor, which constituted a more difficult but more accurate operation that indicated the weighted quantity of deposits formed. These deposits can then be analyzed for all practical purposes.)

11 Demetallization by Extraction of Residues or Feeds

These are the properties of a Kuwait RsV that we would use as the reference feed in our conversions.

A fractionation by extraction with Propane C3, Butane C4 and Pentane C5 makes it possible to separate the components of this residue under vacuum according to their nature, ranging from DAO (for deasphalted Oils) to very hard Asphalts (Asp C5).

| FRACTIONATION OF RsV BY EXTRACTION C3–C5 6/1 | | | | | |
|---|---|---|---|---|---|
| POSITION | DAO C3 | Ex C4 | Ex C5 | Asp C5 | RsV |
| % RsV FEED | 18.7 | 33.7 | 30.4 | 17.5 | 100% RsV |
| Density 20° C. | 0.896 | 1.000 | 1.047 | 1.067 | 1.010 |
| Refractive index 20° C. | 1.519 | 1.592 | 1.624 | 1.641 | 1.59415 |
| Tf ° C. | 50 | 60 | 100 | 146 | +41° C. |
| Sediments | | | | | 0.09% Pds |
| Res. Carb. % RsV | 0.62 | 2.96 | 8.09 | 8.23 | 19.9 |
| Sulfur % RsV | 0.53 | 1.62 | 1.62 | 1.23 | 5.0 |
| Nickel ppm RsV | 0.2 | 10.2 | 14.4 | 17.2 | 42 |
| Vanadium ppm RsV | 1.0 | 32.3 | 47.2 | 55.5 | 136 |
| NaCl % Wt. | — | — | 0.0003 | 0.0107 | 0.0110 |
| VISC. Cst 100° C. | | | | | 1402 Cst |
| H/C | 1.64 | 1.35 | 1.22 | 1.18 | H/C = 1.33 |

It is observed that the metals (Nickel, Vanadium) are concentrated in the most polyaromatic products with a high refractive index n and with the highest density. The same applies to salts and sulfur.

These components constitute a hindrance because they are poisons for any subsequent catalytic refining treatments that may be performed. The polyaromatics that contain said components are coking precursors and, when they are mixed, increase the viscosity of the products to the point that they can no longer be pumped, thus greatly reducing the quality of the fuels used for fuel applications. Due to all of these reasons, it would be necessary to extract them separately.

The conversion of this residue under vacuum (RsV) described in example No. 1 provided us with the following extract on the extraction [13.4]:

| VERY LOW FLOW: | | % in the Cut | | |
|---|---|---|---|---|
| RECYCLING + PURGE | DsV Cut | % Wt. | Dp/v | n |
| [13.4] | 360° C. | PI–195 Nothing . . . | | |
| | | 195–250 8.63 | 0.859 | 1.49888 |
| | | 250–300 43.33 | 0.904 | 1.53737 |
| | | RsV.4 48.04 | | 1.625 |

By referred to the densities and refractive indexes, it is observed that the extract [13.4] is practically and exclusively composed of EXC4, EXC5 and AspC5.

However, the analysis of extract [13.3] shows that it contains practically no components laden with Metals, Salts, Sulfur, etc., as its heaviest fraction is a DAO and 10% of RV.3 is equivalent to a EXC3.

| RECYCLING: MAIN FLOW | | DsV Cut | % in the Cut | | |
|---|---|---|---|---|---|
| | | | % Wt. | Dp/v | n |
| [13.3] | 200° C. | Pl–200 | 8.24 | 0.831 | 1.50099 |
| | | 200–250 | 29.21 | 0.903 | 1.50835 |
| | | 250–330 | 52.18 | 0.932 | 1.51879 |
| | | RsV.3 | 10.37 | | 1.595 |
| [13.5] | 470° C. NOTHING | | | | |

(The extractor [13.5] operates as a safety device.)

At 360° C. and at the atmospheric pressure, the EXTRACTOR [13.2] demetallizes the feed in an efficient and controlled manner by concentrating the Metals, Salts and Sulfur in a well-defined extract [13.4] which constitutes a new characteristic of one embodiment.
Content of Metals and other Impurities of Crudes and Residues By fractionating a typical residue under vacuum through well known refining techniques with propane C3, butane C4, pentane C5, the following extracts and raffinates are obtained:

| POSITION | DAO C3 | Ex C4 | Ex C5 | Asp C5 | RsV |
|---|---|---|---|---|---|
| % RsV FEED | 18.7 | 33.7 | 30.4 | 17.5 | 100% RsV |
| Sediments | | | | | 0.096% Pds |
| Sulfur % RsV | 0.53 | 1.62 | 1.62 | 1.23 | 5.0% Pds |
| Nickel ppm RsV | 0.2 | 10.2 | 14.4 | 17.2 | 42 |
| Vanadium ppm RsV | 1.0 | 32.3 | 47.2 | 55.5 | 136 |
| NaCl % Wt. | — | — | 0.0003 | 0.0107 | 0.0110 |
| H/C | 1.64 | 1.35 | 1.22 | 1.18 | H/C = 1.33 |

The DAO is the product called deasphalted oil; ExC4 is the extract with C4; ExC5 is the extract with C5 and Asp C5 is the corresponding residual asphalt obtained.

The metals, NaCl and sulfur are concentrated in highly aromatic heavy molecules with a low hydrogen content.

Upon combustion, these residues give ashes that have a typical relative composition, as indicated below:

| Ashes: SiO2:32 | Fe2O3:25 | Na:16 | Va:14 | Ni:6 | Al:6 |
|---|---|---|---|---|---|

Furthermore, we know that eutectics (Glass) appear towards 550°–650° C.
Silica+Soda→Classic Glass (Silicate)
Silica+V2O5→Vanadium Glass
Silica+Nickel→Nickel Glass
Silica+Ashes→Glass with Iron, Ni, etc.
Therefore, it is observed that any catalyst is fatally "encumbered with glass" by the metals.

Since our soaking reactor is empty, it can withstand long runs without quick deposits on its walls, as it was also observed, for other considerations, that it should operate in this case towards 460–480° C. Therefore, the metals are carried and extracted by the heaviest liquid products.

Motor oils were converted which require a reactor at 500–520° C. It was actually observed that there were few noncombustible deposits on the walls of the soaking reactor. This led us to generalize the technique for the mechanical cleaning of the extraction of carbonaceous residues accompanied by metal deposits, preferably by burning (which leaves metal deposits and ashes on the walls). Here also, since the soaking reactor is empty, no problems were encountered in conducting this mechanical scrubbing and scaling operation. The sulfur does not present any problems.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A process for the conversion of hydrocarbons comprising residues and/or heavy distillates which may be laden with impurities into lighter liquid products, the process comprising:
    (a) preheating a hydrocarbon load comprising residues and heavy distillates to a first temperature which is below a temperature, at ambient conditions of the load, that is sufficient for conversion of the residues and/or heavy distillates of the load;
    (b) treating the pre-heated load with a jet of gas so as to initiate conversion of the residues and/or heavy distillates of the load into lighter liquid products so as to form smaller hydrocarbon molecules from the residues and/or heavy distillates, wherein the gas-load mixture has a temperature insufficient to initiate such conversion for the conditions under which the gas-load mixture is maintained;
    (c) injecting the treated load into a non-catalytic reactor configured to enable the conversion reactions initiated by the jet of gas to achieve equilibrium, wherein the reactor is operated at a second temperature, wherein the second temperature is higher than the first temperature.

2. A process for the conversion of hydrocarbons comprising residues and/or heavy distillates which may be laden with impurities into lighter liquid products, the process comprising:
    (a) preheating a hydrocarbon load comprising residues and/or heavy distillates to a first temperature which is below the temperature sufficient for conversion of the hydrocarbons of the residues and/or heavy distillates to smaller molecules; and
    (b) treating the pre-heated hydrocarbon load with a jet of gas at a second temperature, wherein the resulting gas-load mixture has a temperature insufficient to initiate conversion of the hydrocarbons of the residues and/or heavy distillates to smaller molecules for the conditions under which the gas-load mixture is maintained, the jet of gas having a speed which is sufficient to mechanically shear residue and/or heavy distillate molecules of the load so as to initiate conversion of hydrocarbon molecules comprising said residues and/or heavy distillates in said pretreated hydrocarbon load to smaller molecules, wherein the treating of the pre-heated load is carried out in an injector, and-wherein the speed of the jet does not, under the ambient conditions found within the injector, promoter the formation of gas;
    (c) injecting the treated load from the injector into a reactor configured to enable to conversion reactions initiated by the jet to achieve equilibrium, wherein the reactor is operated at a second temperature, wherein the second temperature is higher than the first temperature and the reactor is not filled with catalyst.

3. A process for the conversion of a hydrocarbon load comprising residues and/or heavy distillates which may be laden with impurities, said hydrocarbon load requiring a minimum conversion activation barrier to be exceeded to cause heavy molecules in the load to break into lighter molecules, the process comprising:

(a) preheating the hydrocarbon load to a temperature that is below a temperature sufficient to overcome the minimum conversion activation barrier;

(b) driving into a restricted zone a superheated gas and the pre-heated hydrocarbon load of step (a) to produce a driving force in the mixture comprising the superheated gas and the hydrocarbon load, wherein the temperature of the superheated gas and the hydrocarbon load of step (a) are selected such that the mixture has a temperature insufficient to overcome said minimum conversion activation barrier for the pressure and residence time within said restricted zone, but wherein such temperatures are selected such that the temperature of the mixture in conjunction with the kinetic energy supplied by said driving force under the pressure and residence time in the restricted zone is sufficient to overcome said minimum conversion activation barrier; and further wherein the driving force is selected to be below a force that produces more than about 4 weight percent gas based on the weight of the processed hydrocarbon load upon conversion of the hydrocarbon load;

(c) injecting the mixture of step (b) into a reactor configured to allow thermodynamic equilibrium to be attained, wherein said reactor does not comprise a fluidized bed, and has a temperature, pressure and residence time insufficient in themselves for thermal cracking of the hydrocarbons in said mixture.

4. The process of claim 3 wherein said superheated gas has an oxygen atom.

5. The process of claim 3, wherein said superheated gas is selected from the group consisting of: $H_2O$ and $CO_2$ or combination thereof.

6. The process of claim 3 wherein said hydrocarbon load comprises $H_2O$.

7. The process of claim 5 wherein the $H_2O$ to hydrocarbon ratio of the mixture of step (b) is not less than 0.7.

8. The process of claim 4 wherein the gas to hydrocarbon ratio of the mixture of step (b) is not less than 0.7.

9. The process of claim 3 wherein at step (b) said superheated gas and said hydrocarbon load are provided in separate streams converging in said restricted zone.

10. The process of claim 3 wherein said reactor is empty.

11. The process of claim 3 wherein said hydrocarbon load is laden with at least one impurity selected from the group consisting of: vanadium, nickel, sodium, iron, aluminum, SiO2, sediments and sulfur, and combinations thereof.

12. The process of claim 3 wherein said hydrocarbon load comprises at least one hydrocarbon selected from the group consisting of: crude oil, atmospheric residue (Rat), residue under vacuum (Rs V) or heavy distillates, and combinations thereof.

13. The process of claim 3 wherein the conversion rate of heavy molecules into lighter molecules each run is about 30% or more.

14. The process of claim 3 wherein the process is repeatedly undertaken on one or more hydrocarbon(s) fraction produced by the process to improve the yield of converted hydrocarbons.

15. The process of claim 3 wherein no catalyst is utilized.

16. The process of claim 3 wherein the residence time in said reactor of step (c) is less than or equal to 25 seconds.

17. The process of claim 3 wherein the temperature in the reactor of step (c) is between, or equal to, 430° C. and 480° C.

18. The process of claim 3 wherein the hydrocarbon load comprises in part a finely pulverized solid.

19. The process of claim 3 further including step of passing the mixture of step (c) through one or more of said one or more extractor(s).

20. The process of claim 19 wherein the load is passed through one or more extractors wherein said one or more extractors comprise a series of extractors comprising at least a first extractor operated at a first temperature, followed by a second extractor operated at a second temperature, followed by a third extractor operated at a third temperature, wherein the first temperature is higher than the second temperature and the second temperature is higher than the third temperature.

21. The process of claim 3 wherein the hydrocarbon load is vaporized prior to introduction into the path of the superheated gas.

22. The process of claim 3 wherein the hydrocarbon load is not fully vaporized prior to introduction into the path of the superheated gas.

23. The process of claim 3 wherein the temperature of the hydrocarbon load is about 25° C. higher than the input temperature of said reactor.

24. A process for the conversion, without the need for use of a catalyst, of a hydrocarbon load containing residue and heavy distillates into lighter liquid products, the process comprising the steps of:

(a) preheating said hydrocarbon load to a first temperature that is below a temperature necessary to thermally crack the hydrocarbons comprising residue and/or heavy distillates under the conditions such hydrocarbon load is subjected and injecting said hydrocarbon load into an injector; and (b) injecting a jet of heated gas into said preheated hydrocarbon load in said injector to form a load-jet mixture in said injector, said mixture being at a temperature that in itself is insufficient to convert the hydrocarbon load under the conditions such hydrocarbon load is subjected and wherein said mixture attains sufficient non-thermal energy from the jet for conversion of the residue or heavy distillates to lighter liquid products and wherein the speed of the jet is insufficient to impart energy sufficient to break such residues or heavy distillates into very small fragments.

25. The process of claim 24 wherein the process produces substantially no gaseous hydrocarbons, coke or soot.

26. The process of claim 24 wherein the jet of step (b) comprises steam.

27. The process of claim 24 wherein the process produces a stable water-hydrocarbon emulsion.

28. The process of claim 27 wherein the water-hydrocarbon emulsion is stable for periods of two or more months when the emulsion is unagitated.

29. The process of claim 27 wherein the water-hydrocarbon emulsion is stable for more than one year when the emulsion is unagitated.

30. The process of claim 24 wherein the jet of step (b) comprises $CO_2$.

31. The process of claim 24 wherein conversion of the hydrocarbons comprising residue and heavy distillates of the load entails breaking such molecules substantially into two parts.

32. The process of claim 24 wherein the jet of step (b) comprises at least one or more gases selected from the group consisting of: $H_2O$, $CO_2$, CO, $H_2$ and $N_2$, and combinations thereof.

* * * * *